(12) United States Patent
Malm et al.

(10) Patent No.: US 11,643,144 B2
(45) Date of Patent: May 9, 2023

(54) VEHICLE BODY STRUCTURE

(71) Applicant: Nissan North America, Inc., Franklin, TN (US)

(72) Inventors: Daniel Malm, Ann Arbor, MI (US); Ryan Corby, Novi, MI (US); Adam Strean, Highland Township, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/362,793

(22) Filed: Jun. 29, 2021

(65) Prior Publication Data

US 2022/0410976 A1    Dec. 29, 2022

(51) Int. Cl.
*B62D 21/15*    (2006.01)
*B62D 25/08*    (2006.01)

(52) U.S. Cl.
CPC ......... *B62D 21/155* (2013.01); *B62D 25/082* (2013.01)

(58) Field of Classification Search
CPC .............................. B62D 21/155; B62D 25/085
See application file for complete search history.

(56) References Cited

U.S. PATENT DOCUMENTS

| | | | |
|---|---|---|---|
| 8,562,021 B1 | 10/2013 | Kuwabara et al. | |
| 8,596,711 B2 | 12/2013 | Yasui et al. | |
| 8,851,520 B2 | 10/2014 | Goellner et al. | |
| 9,180,913 B2 | 11/2015 | Ameloot et al. | |
| 10,479,409 B2 | 11/2019 | Fujiwara et al. | |
| 10,654,525 B2 * | 5/2020 | Komiya | B62D 21/11 |
| 10,661,834 B2 | 5/2020 | Legray et al. | |
| 2012/0242113 A1 * | 9/2012 | Yasuhara | B62D 21/155 296/193.07 |
| 2012/0248820 A1 * | 10/2012 | Yasui | B62D 21/152 296/193.09 |
| 2014/0062129 A1 | 3/2014 | Syed et al. | |
| 2014/0110925 A1 * | 4/2014 | Goellner | B62D 21/155 280/781 |
| 2014/0191105 A1 * | 7/2014 | Dandekar | B62D 21/11 248/671 |
| 2014/0265442 A1 * | 9/2014 | Makino | B62D 25/082 296/187.1 |
| 2014/0312654 A1 * | 10/2014 | Komiya | B62D 21/155 296/187.09 |

(Continued)

*Primary Examiner* — Paul N Dickson
*Assistant Examiner* — Kurtis Nielson
(74) *Attorney, Agent, or Firm* — Global IP Counselors, LLP

(57) ABSTRACT

A vehicle body structure includes an engine cradle and an impact receiving structure. A forward end of the first side portion and a first lateral end of a front portion of the engine cradle are fixedly attached to one another. The first side portion has a rearward section and a forward section, the rearward section being horizontally oriented and the forward section extending upward and forward from the rearward section defining an acute angle therebetween, the acute angle being between 30 and 35 degrees. The impact receiving structure is installed to the first side portion of the engine cradle proximate an intersection between the first side portion and the front member. A lower surface of the impact receiving structure extends downward along the forward section of the first side portion further defining the acute angle of the forward section of the first side portion of the engine cradle.

20 Claims, 17 Drawing Sheets

(56) References Cited

U.S. PATENT DOCUMENTS

| | | | |
|---|---|---|---|
| 2014/0333091 A1* | 11/2014 | Stockard | F16F 7/125 |
| | | | 296/187.03 |
| 2015/0021115 A1* | 1/2015 | Komiya | B62D 21/11 |
| | | | 180/312 |
| 2015/0298742 A1 | 10/2015 | Ono et al. | |
| 2017/0008565 A1* | 1/2017 | Murata | B62D 27/023 |
| 2018/0118274 A1* | 5/2018 | McConnell | B62D 21/03 |
| 2018/0281863 A1* | 10/2018 | Daikokuya | B62D 21/155 |
| 2019/0300059 A1* | 10/2019 | Komiya | B62D 53/067 |
| 2020/0114971 A1* | 4/2020 | Kobayashi | B62D 25/082 |
| 2022/0033003 A1* | 2/2022 | Kim | B62D 25/2018 |

* cited by examiner

VEHICLE BODY STRUCTURE

BACKGROUND

Technical Field

The present disclosure generally relates to vehicle body structure. More specifically, the present disclosure relates to vehicle body structure with an engine cradle (also referred to as a sub-frame) with impact receiving structures at each of the two front corners thereof.

Background Information

Engine cradles (sub-frames configured to support an engine and transmission of a vehicle) are typically installed to an underside front side members of a frame of a vehicle body structure.

SUMMARY

One object of the present disclosure is the inclusion of impact receiving structures installed to outboard front areas of an engine cradle that received impact energy during an impact event and transmit the impact energy to the vehicle frame via the engine cradle and further transmit some of the impact energy to an engine and transmission installed within the engine cradle.

In view of the state of the known technology, one aspect of the present disclosure is to provide a vehicle body structure with an engine cradle, an attachment collar and an impact receiving structure. The engine cradle has at least a first side portion and a front portion. A forward end of the first side portion and a first lateral end of the front portion are fixedly attached to one another defining a first front corner of the engine cradle. The first side portion has a rearward section and a forward section, the rearward section being horizontally oriented and the forward section extending upward and forward from the rearward section defining an acute angle therebetween, the acute angle being between 30 and 35 degrees. The attachment collar has a lower end attached to the first front corner of the engine cradle and an upper end attached to a front member of a vehicle frame member. The impact receiving structure is installed to the first side portion of the engine cradle proximate an intersection between the first side portion and the front member. The impact receiving structure has a forward portion adjacent to the attachment collar and a rearward portion that extends along the forward section of the first side portion. A lower surface of the impact receiving structure extends downward along the forward section of the first side portion further defining the acute angle of the forward section of the first side portion of the engine cradle.

Another aspect of the present disclosure is to provide a vehicle body structure with an engine cradle, an attachment collar and an impact receiving structure. The engine cradle has at least a first side portion and a front portion, a forward end of the first side portion and a first lateral end of the front portion are fixedly attached to one another defining a first front corner of the engine cradle. The first side portion has a forward section and a rearward section. The attachment collar has a lower end attached to the first front corner of the engine cradle and an upper end attached to a front member of a vehicle frame member. The impact receiving structure is installed to the first side portion proximate an intersection between the first side portion and the front member. The impact receiving structure has a forward portion adjacent to the attachment collar and a rearward portion that extends along the forward section of the first side portion. The forward portion is welded to the attachment collar via a first weld having a first attachment strength, and the rearward portion being welded to the forward section of the first side portion via a second weld having a second attachment strength that is greater than the first attachment strength.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
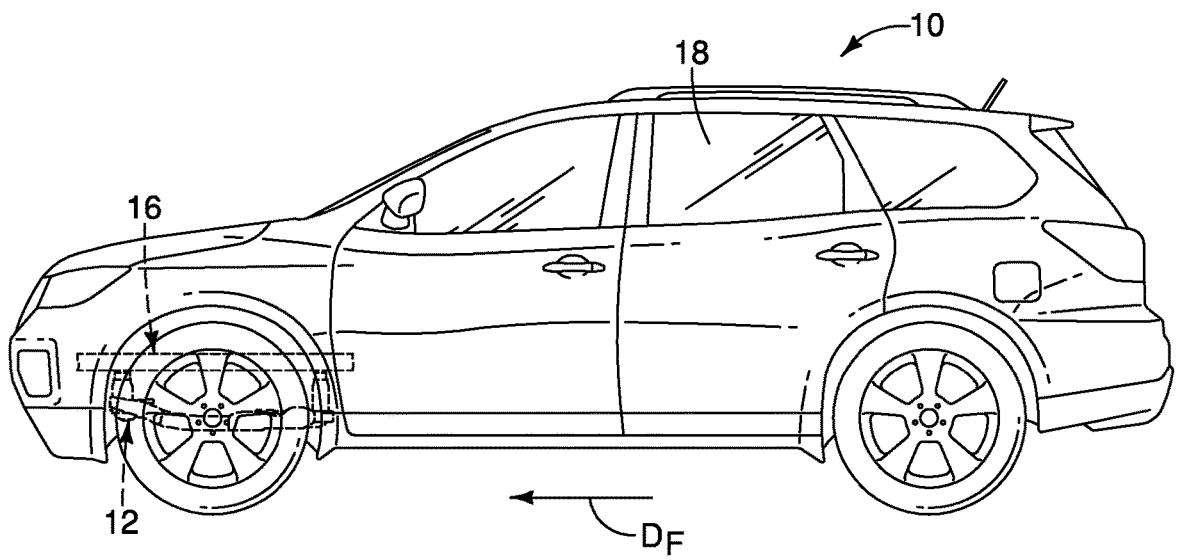
FIG. 1 is a side view of a vehicle that includes a front side member (a frame member) attached to an engine cradle with an impact receiving structure in accordance with a first embodiment.
Figure 2:
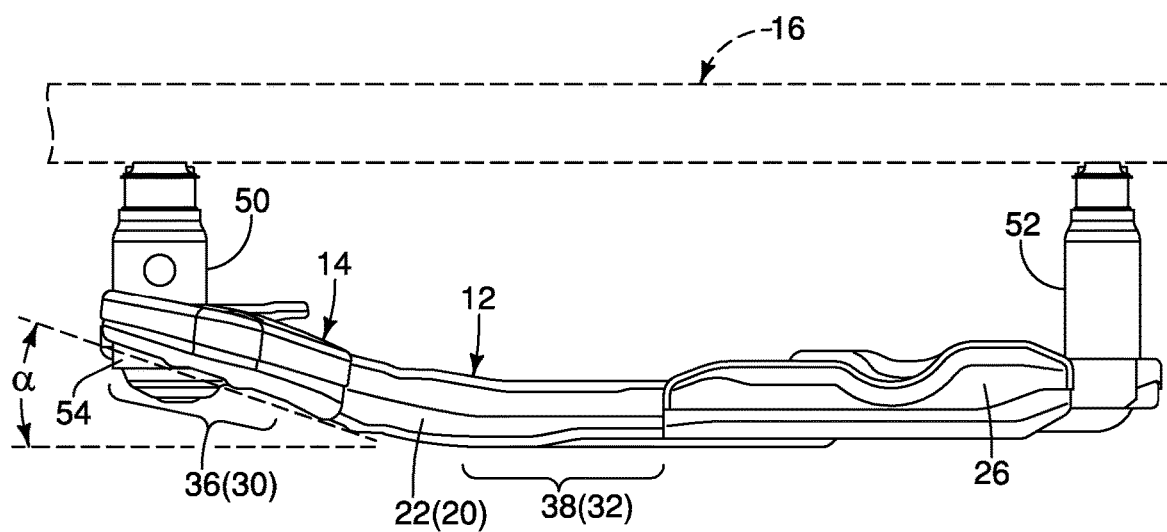
FIG. 2 is a side view of the front side member, the engine cradle and the impact receiving structure removed from the vehicle in accordance with the first embodiment.

Referring initially to FIGS. 1 and 2, a vehicle 10 with an engine cradle 12 and an impact receiving structure 14 (not shown in FIG. 1) is illustrated in accordance with a first embodiment.

The vehicle 10 includes frame elements such as front side members 16, as shown in phantom in FIGS. 1 and 2. The front side members 16 are structural or frame elements that extend forward from the structures that define a passenger compartment 18 within the vehicle 10. The engine cradle 12 (also referred to as a sub-frame) is attached to the front side members 16, as described in greater detail below.

Figure 3:
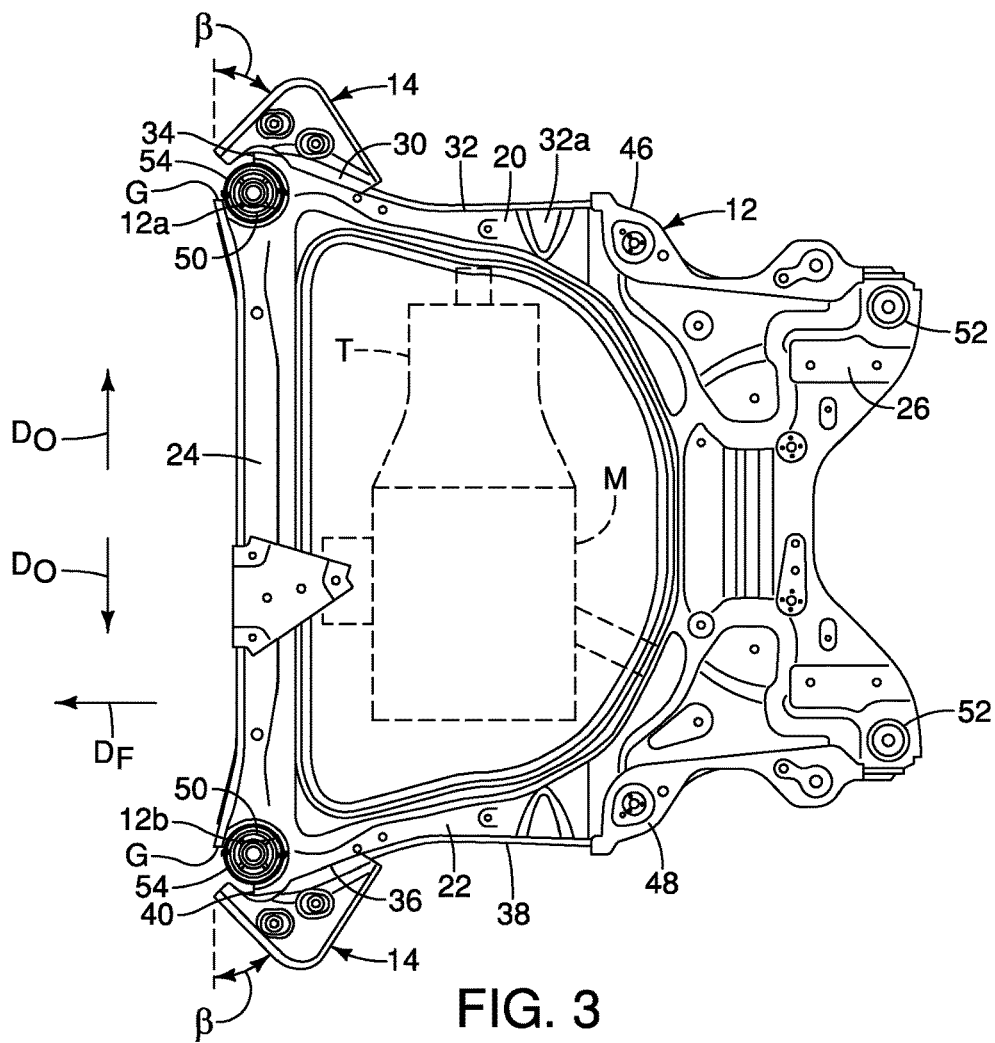
FIG. 3 is a top view of the engine cradle and the impact receiving structures with engine and transmission shown in phantom within the confines of the engine cradle showing the relationships between attachment structures and the impact receiving structures in accordance with the first embodiment.
Figure 4:
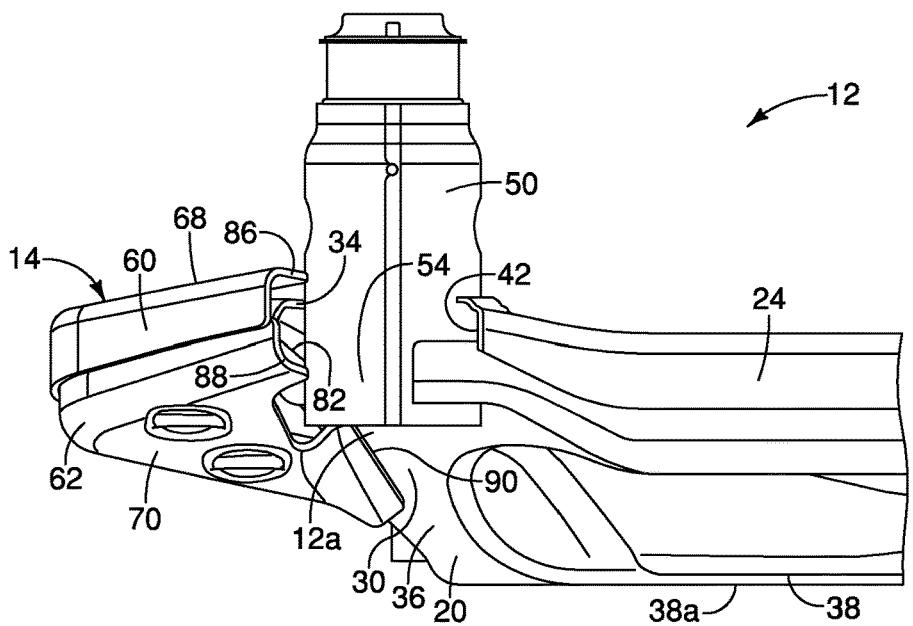
FIG. 4 is a front view of a first front corner of the engine cradle showing the corresponding impact receiving structure and the corresponding attachment structure at the first front corner of the engine cradle in accordance with the first embodiment.

As shown in FIG. 3, the engine cradle 12 includes a first side portion 20, a second side portion 22, a front portion 24 and a rear portion 26. The first side portion 20, the second side portion 22 and the rear portion 26 include upper and lower members that are welded to one another. The front portion 24 can include upper and lower members welded to one another, or, can be a single member. The first side portion 20, the second side portion 22, the front portion 24 and the rear portion 26 are welded to one another defining the cradle member 12 (sub-frame) as depicted in FIGS. 2 and 3.

More specifically, the first side portion 20 includes a forward section 30, a rearward section 32 and a front end 34. The second side portion 22 includes a forward section 36, a rearward section 38 and a front end 40. The front portion 24 includes a first lateral end 42 and a second lateral end 44. The rear portion 26 includes a first lateral side 46 and a second lateral side 48. The front end 34 of the first side portion 20 is welded to the first lateral end 42 of the front portion 26 defining a first front corner 12a of the engine cradle 12. The front end 40 of the second side portion 22 is welded to the second lateral end 44 of the front portion 26 defining a second front corner 12b of the engine cradle 12. The rearward section 32 of the first side portion 20 is welded to the first lateral side 46 of the rear portion 26. The rearward section 38 of the second side portion 21 is welded to the second lateral side 48 of the rear portion 26. Thus, the engine cradle 12 is a rigid structure that supports an engine M and a transmission T of the vehicle 10, as shown in FIG. 3.

Figure 5:
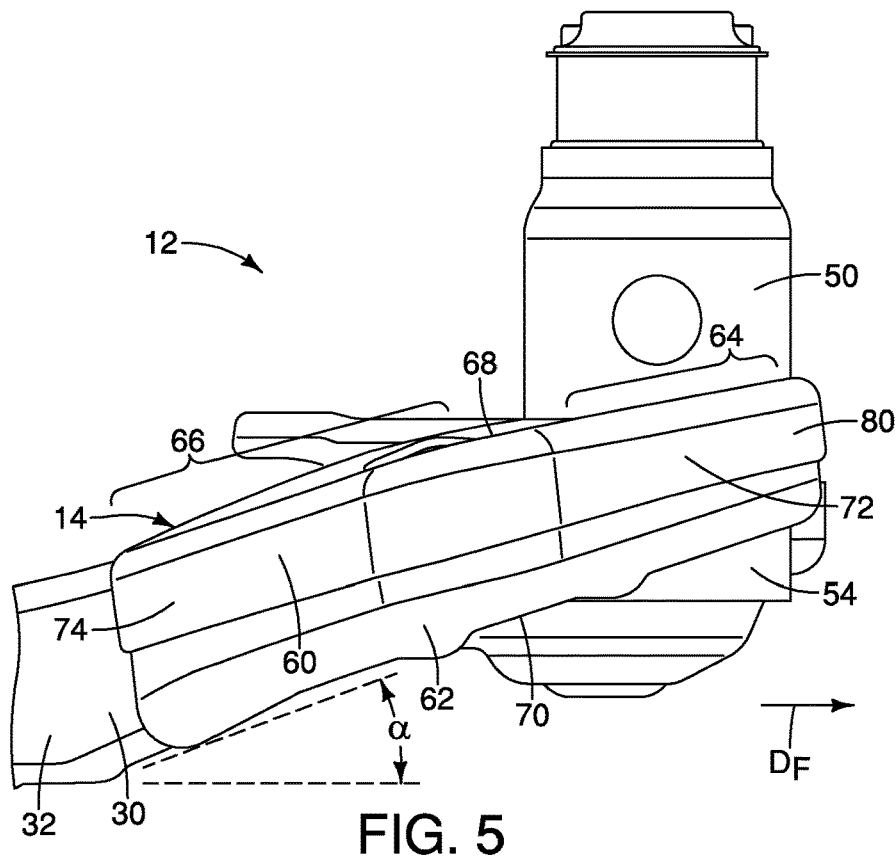
FIG. 5 is a side view of the first front corner of the engine cradle showing inclination of a forward section of a first side portion of the engine cradle and inclination of the impact receiving structure in accordance with the first embodiment.

As shown in FIGS. 2 and 5, the rearward section 32 of the first side portion 20 and the rearward section 38 of the second side portion 22 are level (parallel to the ground with the vehicle 10 on level ground). In other words, the rearward portions 32 and 38 both extend along a plane that is parallel to level ground beneath the vehicle 10.

The forward section 30 of the first side portion 20 and the forward section 36 of the second side portion 22 are inclined such that they both extend upward from the rearward portions 32 and 38 defining an acute angle α, as shown in FIGS. 2 and 5. The acute angle α can be any value between about 30 degrees and 35 degrees. In the depicted embodiment, the acute angle α is 33 degrees. In other words, the front portion 24 is located at a level higher than the rear portion 26 of the engine cradle 12.

The engine cradle 12 further includes forward attachment collars 50 and rearward attachment collars 52. One of the forward attachment collars 50 is installed to the engine cradle 12 at the intersection of the front end 34 of the first side portion 20 and the first lateral end 42 of the front portion 24. Another forward one of the attachment collars 50 is installed to the engine cradle 12 at the intersection of the front end 40 of the second side portion 22 and the second lateral end 44 of the front portion 24.

As shown in FIGS. 3, 4, 7 and 8, a lower section of each of the forward attachment collars 50 are welded to the engine cradle 12 at respective ones of the first and second front corners 12a and 12b. Specifically, as shown in FIG. 3, the forward end 34 of the first side portion 20 and the first lateral end 42 of the front portion 24 are welded to the lower section of the corresponding attachment collar 50 (at the first front corner 12a). Similarly, the forward end 40 of the second side portion 22 and the second lateral end 44 of the front portion 24 are welded to the lower section of the other corresponding attachment collar 50 (at the second front corner 12b). A forward/outboard area 54 of each of the forward attachment collars 50 is exposed and not covered by the engine cradle 12. In other words, a gap G is defined at forward/outboard areas of the engine cradle 12 exposing the forward/outboard area 54 of each of the forward attachment collars 50.

As shown in FIG. 2, the upper ends of the attachment collars 50 and 52 are attached to lower surfaces of the front side members 16 of the vehicle 10 in a conventional manner via, for example, heavy duty mechanical fasteners.

As shown in FIG. 3, the engine cradle 12 (and the vehicle 10) define vehicle outboard directions $D_O$ (relative to a longitudinal center line of the engine cradle 12 and the vehicle 10) and vehicle forward direction $D_F$.

The rearward attachment collars 52 are installed or welded to the engine cradle 12 at predetermined locations on the rear portion 26 of the engine cradle 12.

Other than the features described above, the function and general purpose of engine cradles are conventional and are otherwise conventional vehicle structures well known in the art. Therefore, further description of engine cradles is omitted for the sake of brevity.

As shown in FIG. 3, there are two impact receiving structures 14, one installed to the forward section 30 of the first side portion 20 of the engine cradle 12 and the other installed to the forward section 36 of the second side portion 22 of the engine cradle 12. The two impact receiving structures 14 are identical to one another, except that they are symmetrical mirror images of one another. Since the two impact receiving structures 14 are basically identical, description of only one of the impact receiving structures 14 is provided below and applies equally to both.

A description of the impact receiving structure 14 is provided now with specific reference to FIGS. 4-24. As shown in FIGS. 4-8, the impact receiving structure 14 includes an upper member 60 and a lower member 62 that define a hollow interior H of the impact receiving structure 14. The upper member 60 is shown removed from the impact receiving structure 14 and the engine cradle 12 in FIGS. 9-14. The lower member 62 is shown removed from the impact receiving structure 14 and the engine cradle 12 in FIGS. 15-20. The impact receiving structure 14 is shown removed from the engine cradle 12 in FIGS. 21-24.

The impact receiving structure 12 has a forward portion 64 adjacent to the attachment collar 50 and a rearward portion 66 that extends along the forward section 30 of the first side portion 20.

The upper member 60 of the impact receiving structure 14 has an upper surface 68 that extends downward from the forward portion 64 and along the rearward portion 66 defining the acute angle α relative to a level upper surface 32a of the rearward section 32 of the first side portion 20 of the engine cradle 12. Further, the rearward portion 66 of the impact receiving structure 14 extends along the forward section 36 of the first side portion 20. A lower surface 70 of the lower member 62 of the impact receiving structure 14 extends downward from the forward portion 64 and along the rearward portion 66 further defining the acute angle α. The upper member 60 further includes a front outboard wall 72 that extends downward and a rear outboard wall 74 that also extends downward.

The lower member 62 further includes a front outboard wall 76 that extends upward and a rear outboard wall 78 that also extends upward.

As shown in FIGS. 21-24, the upper member 60 is slightly larger than the lower member 62. Thus, when assembled to one another, the walls 72 and 74 of the upper member 60 are located outboard of outboard walls 76 and 78 of the lower member 62 and partially surround upper edge 62a and portions of the outboard walls 76 and 78 of the lower member 62. The lower outboard edges 60a of the upper member 60 are exposed, but the upper edges 62a of the lower member 62 are at least partially concealed. The upper member 60 and the lower member 62 are welded to one another along the lower outboard edges 60a of the upper member 60 and the adjacent portions of the outboard walls 76 and 78 via any of a variety of welding techniques.

The upper member 60 and the lower member 62 are dimensioned and shaped such that they define a forward facing surface 80 of the impact receiving structure 12. The forward facing surface 80 is closed and extends outboard and rearward. The forward facing surface 80 and the vehicle outboard direction $D_O$ define an acute angle β. The main sections of the front portion 24 of the engine cradle 12 also extends in the vehicle outboard direction $D_O$. The acute angle β is between 35 and 45 degrees. In the depicted embodiment, the angle β is between 38 and 40 degrees, and is preferably approximately 39 degrees.

Figure 6:
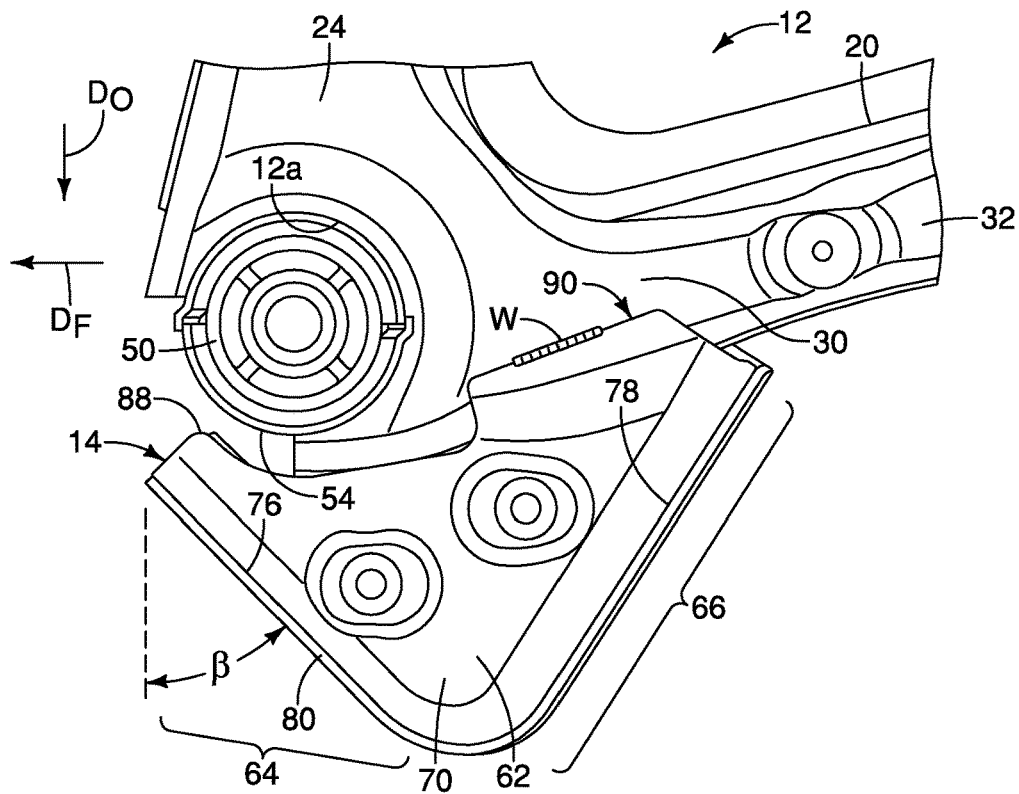
FIG. 6 is a bottom view of the engine cradle and the impact receiving structure in accordance with the first embodiment.
Figure 7:
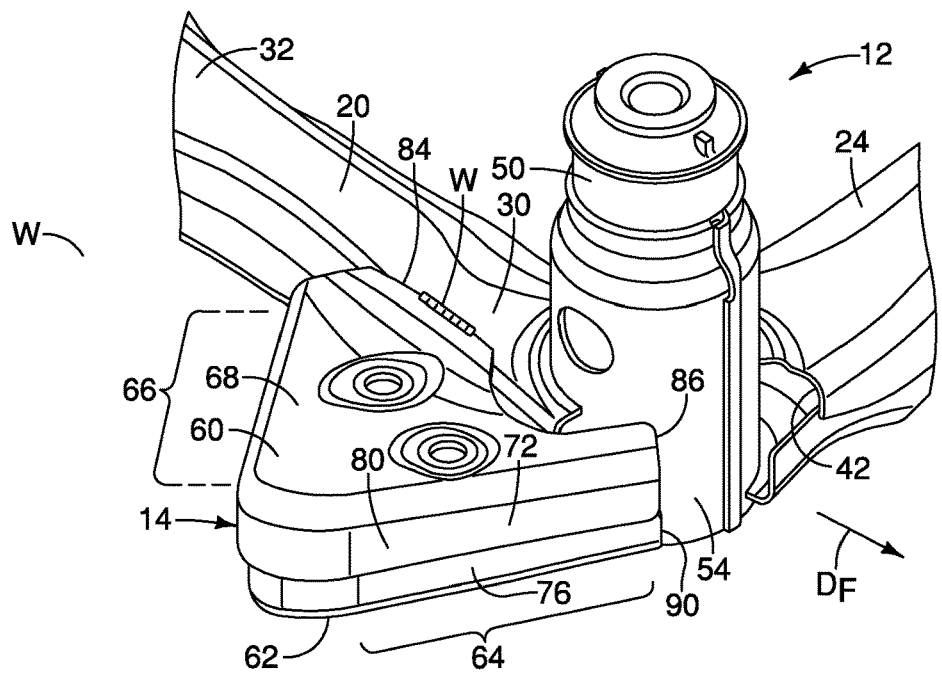
FIG. 7 is a perspective view of the first front corner of the engine cradle showing the impact receiving structure in accordance with the first embodiment.
Figure 8:
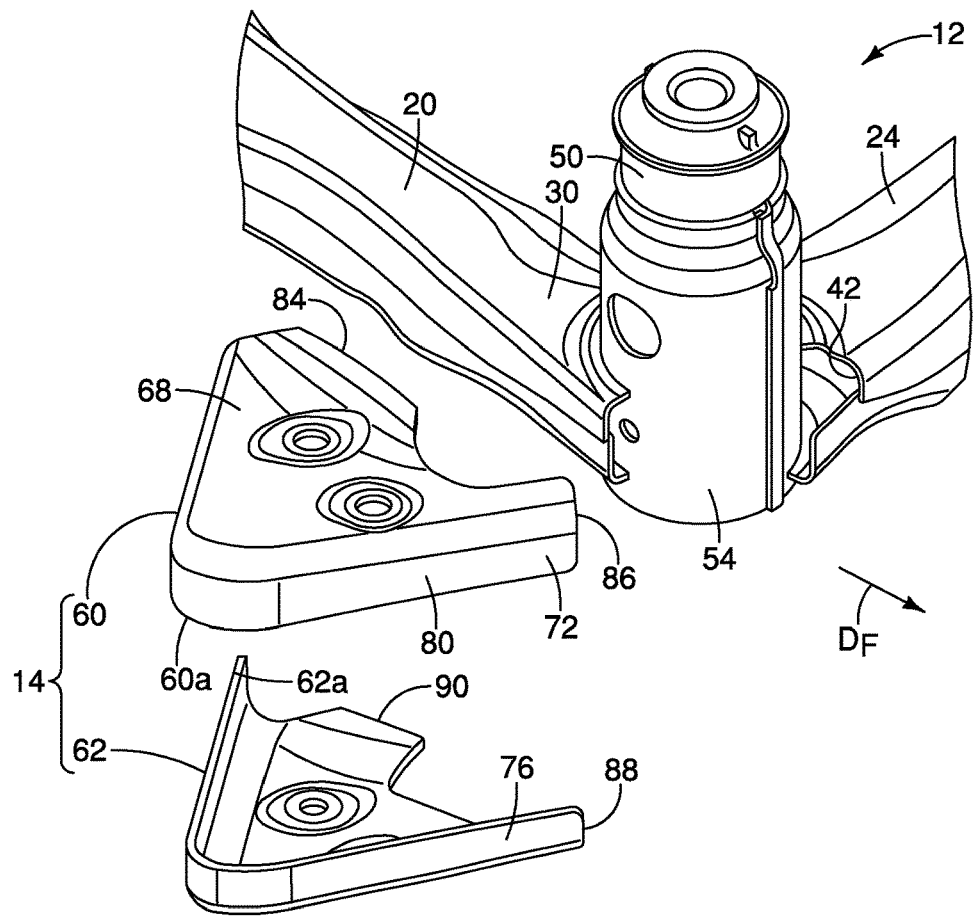
FIG. 8 is an exploded perspective view of the first front corner of the engine cradle showing an upper member and a lower member of the impact receiving structure in accordance with the first embodiment.
Figure 9:
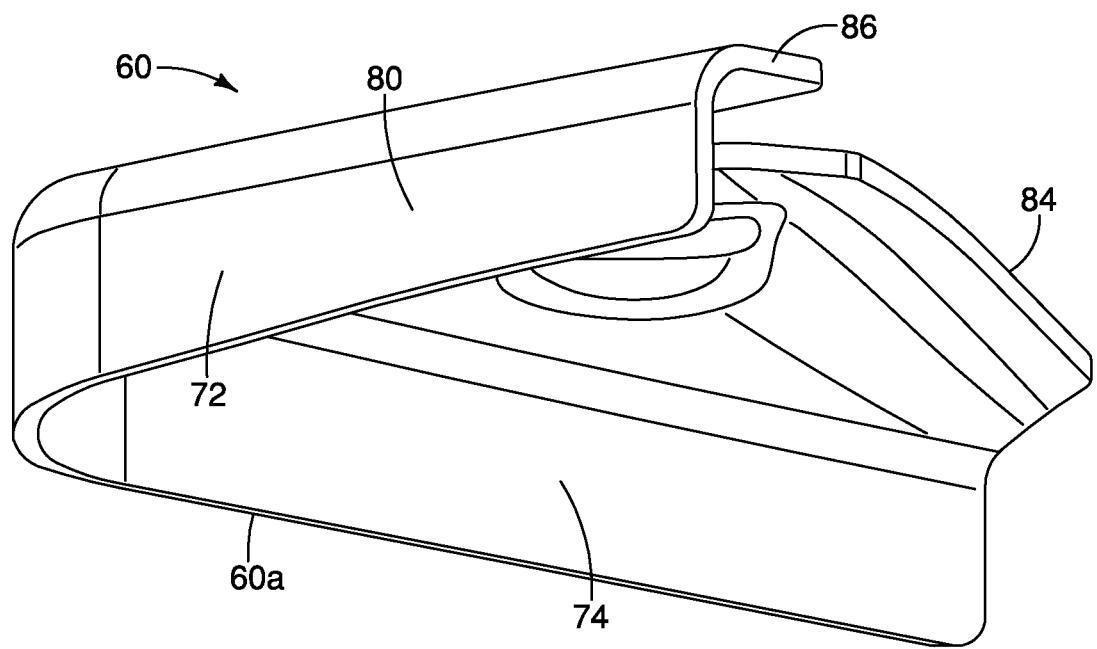
FIG. 9 is a perspective view of the upper member of the impact receiving structure removed from the lower member of the impact receiving structure showing portions of an underside of the upper member in accordance with the first embodiment.
Figure 10:
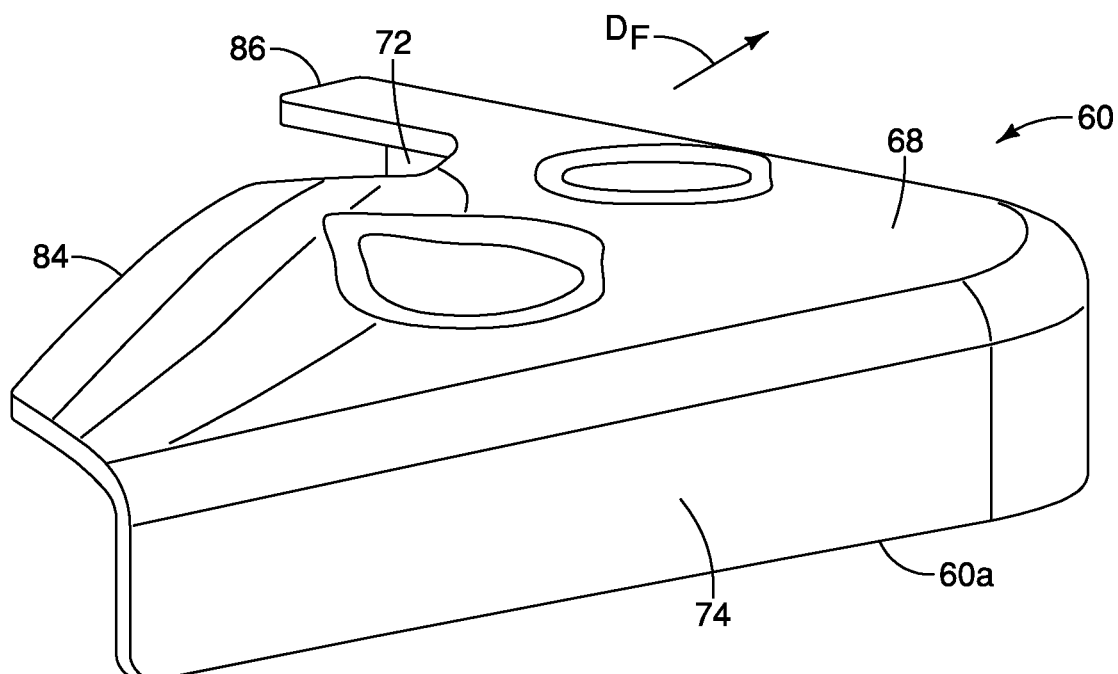
FIG. 10 is a perspective view of the upper member of the impact receiving structure showing portions of an upper side of the upper member in accordance with the first embodiment.
Figure 11:
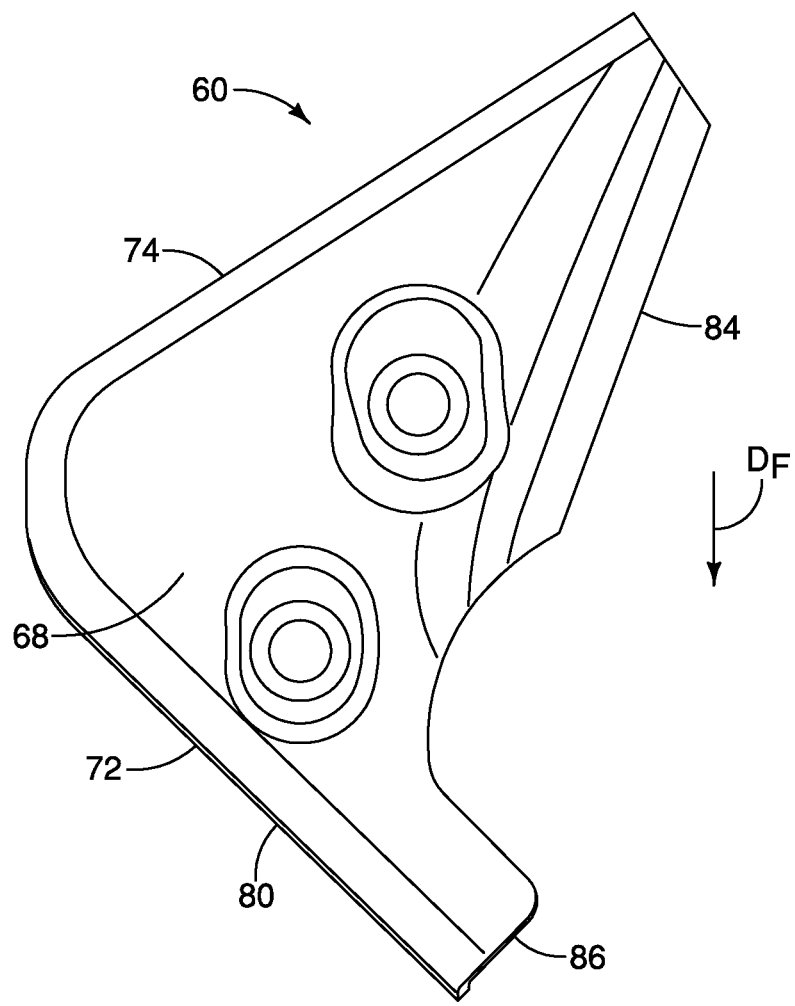
FIG. 11 is a top view of the upper member of the impact receiving structure in accordance with the first embodiment.
Figure 12:
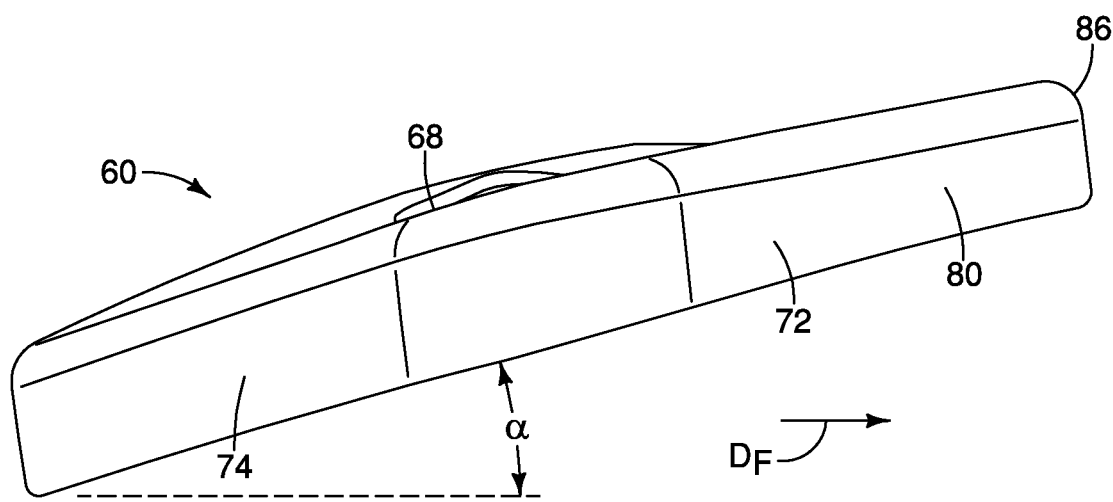
FIG. 12 is a side view of the upper member of the impact receiving structure showing an outboard side of the upper member in accordance with the first embodiment.
Figure 13:
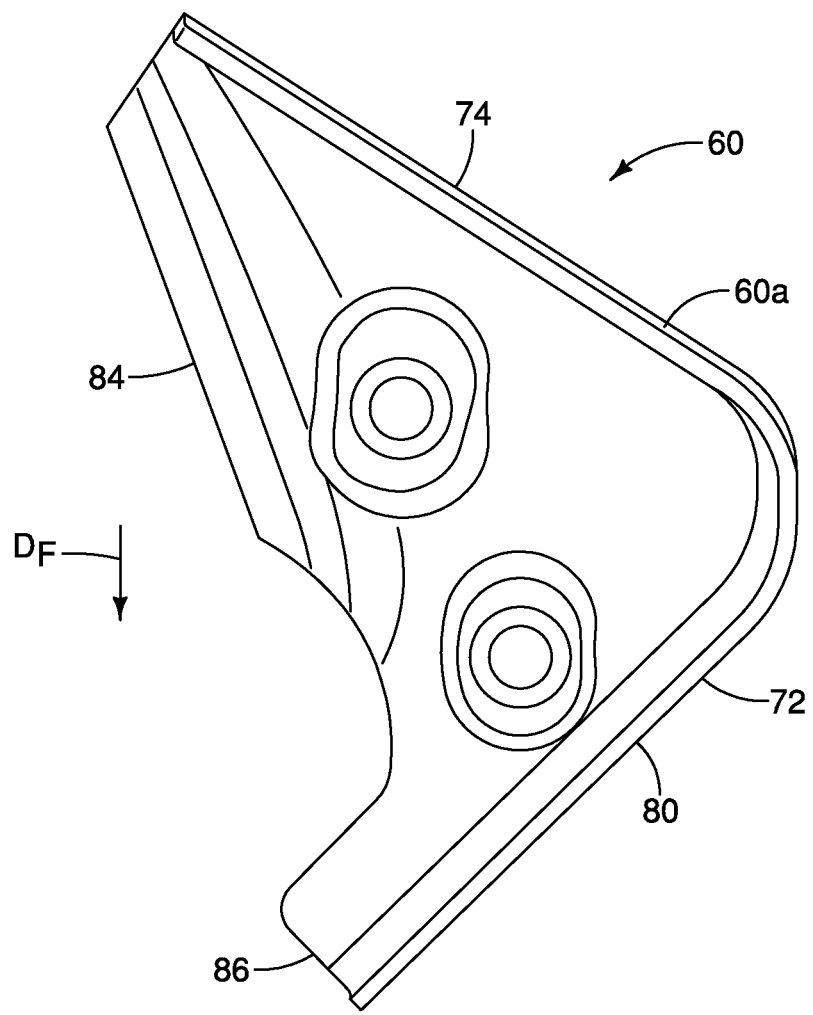
FIG. 13 is a bottom view of the upper member of the impact receiving structure showing a lower surface thereof in accordance with the first embodiment.
Figure 14:
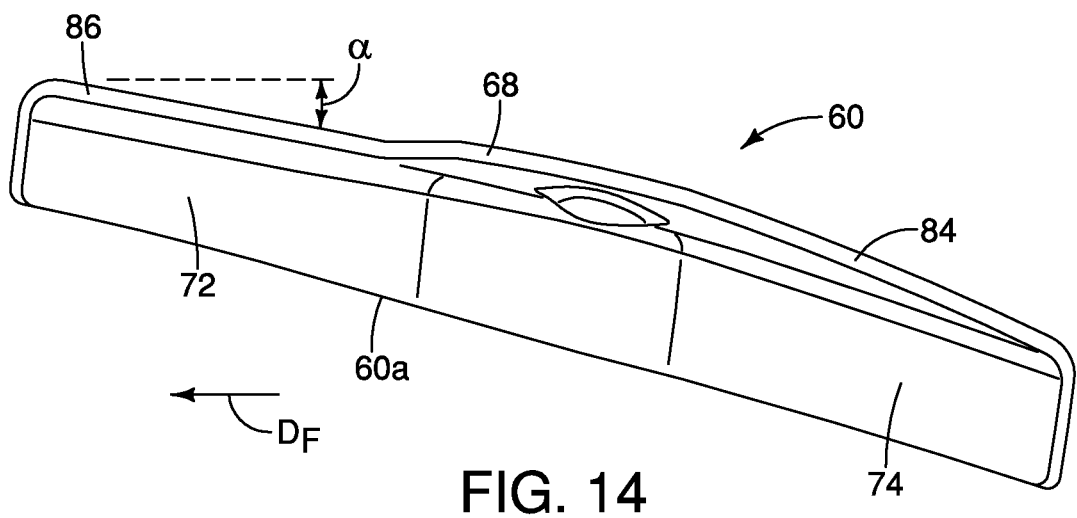
FIG. 14 is another side view of the upper member of the impact receiving structure showing an inboard side of the upper member in accordance with the first embodiment.
Figure 15:
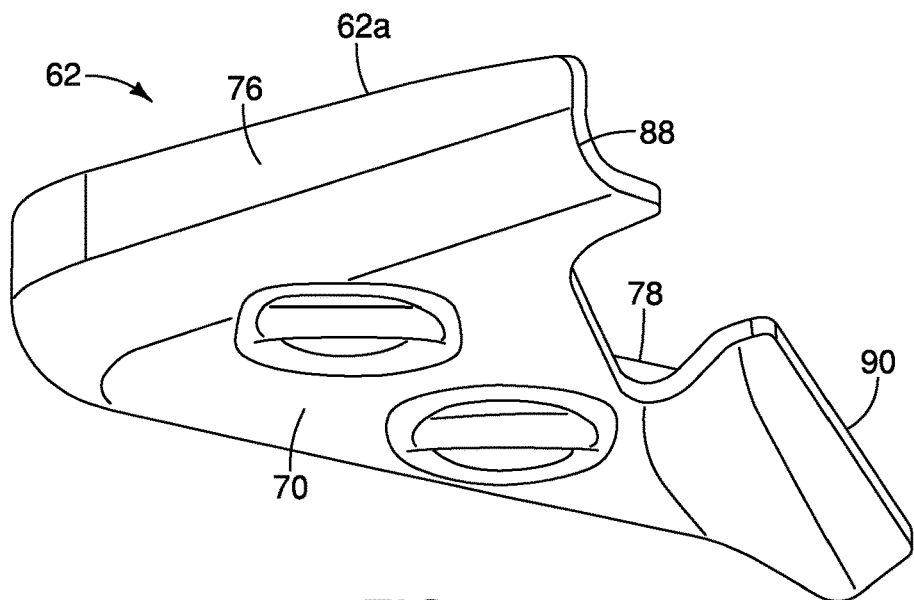
FIG. 15 is a perspective view of the lower member of the impact receiving structure removed from the upper member of the impact receiving structure showing portions of an underside of the lower member in accordance with the first embodiment.
Figure 16:
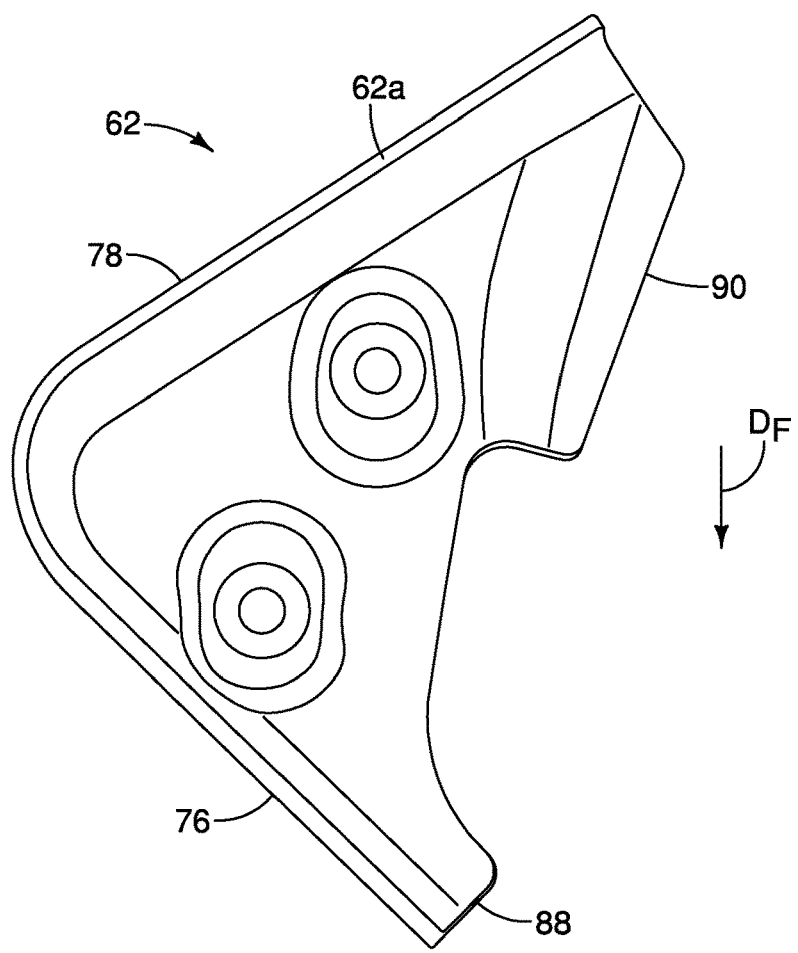
FIG. 16 is a top view of the lower member of the impact receiving structure showing upward facing surfaces thereof in accordance with the first embodiment.
Figure 17:
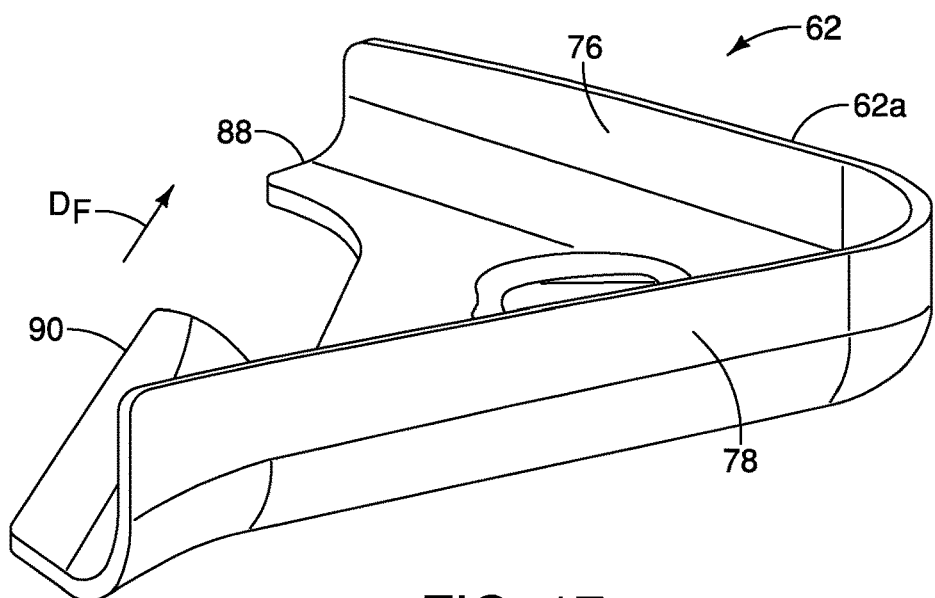
FIG. 17 is a perspective view of the lower member of the impact receiving structure showing portions of an upper side of the lower member in accordance with the first embodiment.
Figure 18:
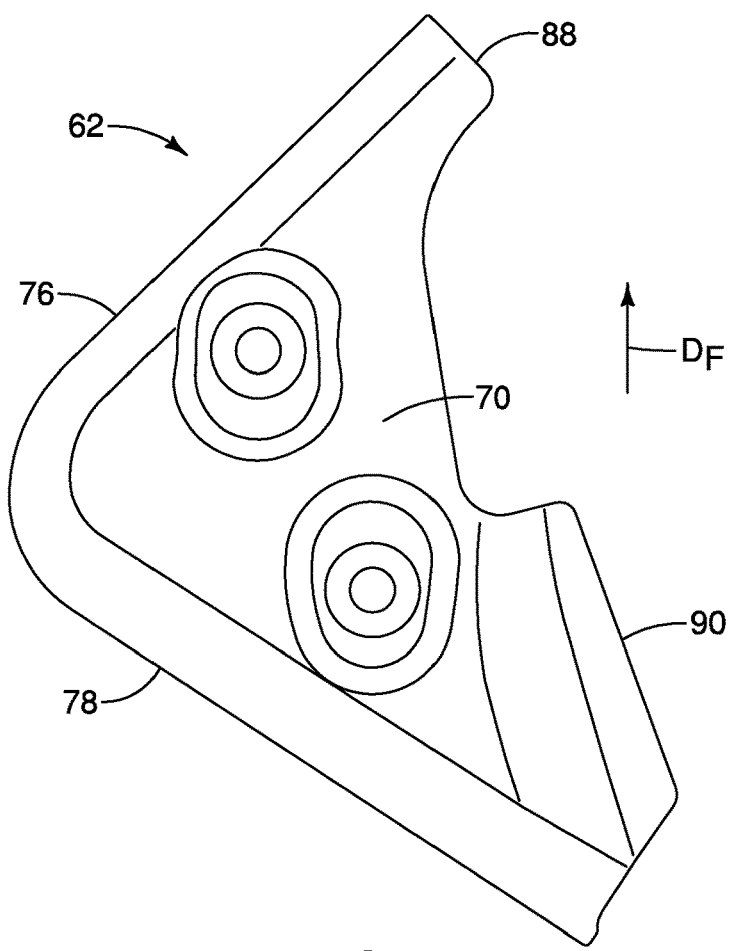
FIG. 18 is a bottom view of the lower member of the impact receiving structure in accordance with the first embodiment.
Figure 19:
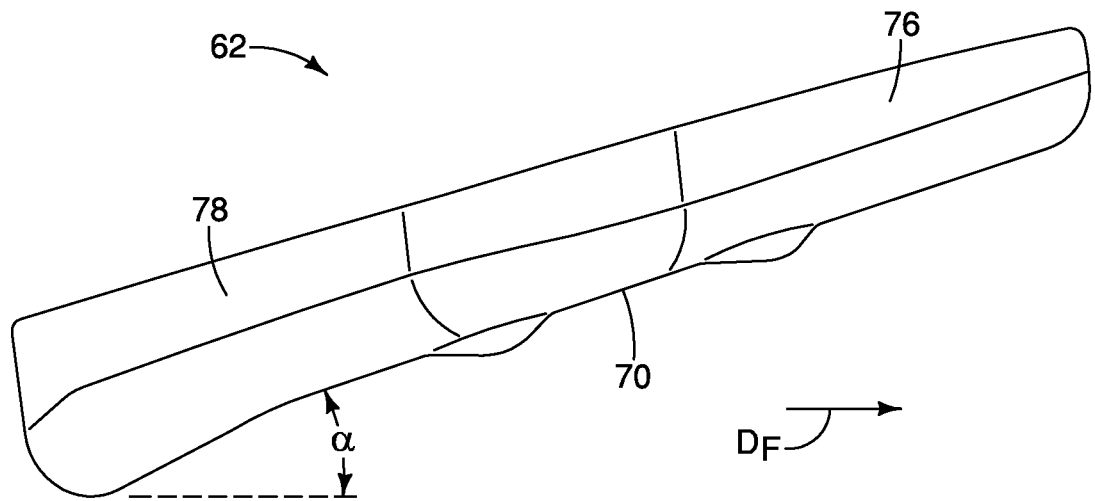
FIG. 19 is a side view of the lower member of the impact receiving structure showing an outboard side of the lower member in accordance with the first embodiment.
Figure 20:
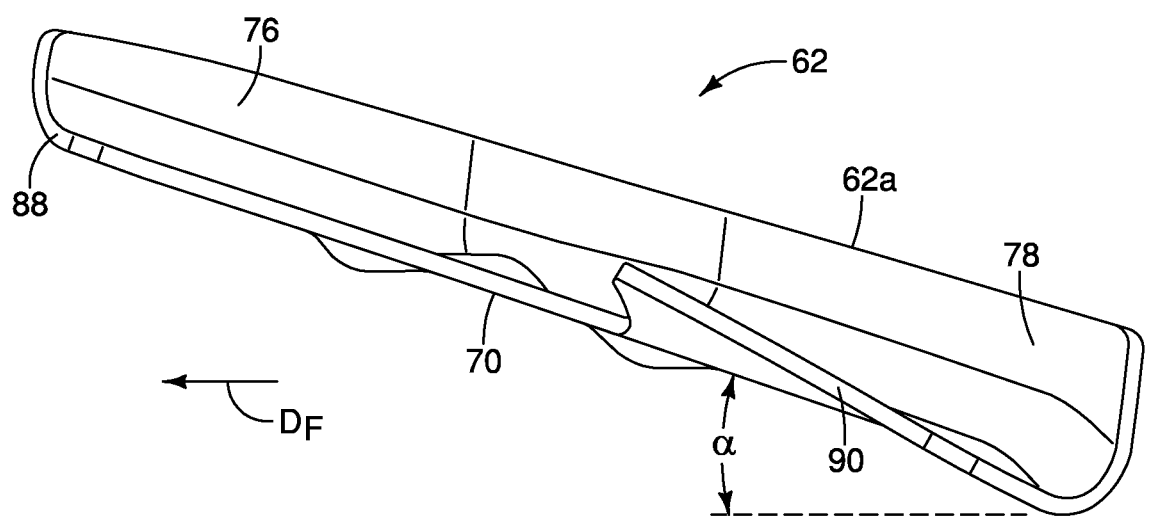
FIG. 20 is another side view of the lower member of the impact receiving structure showing an inboard side of the lower member in accordance with the first embodiment.
Figure 21:
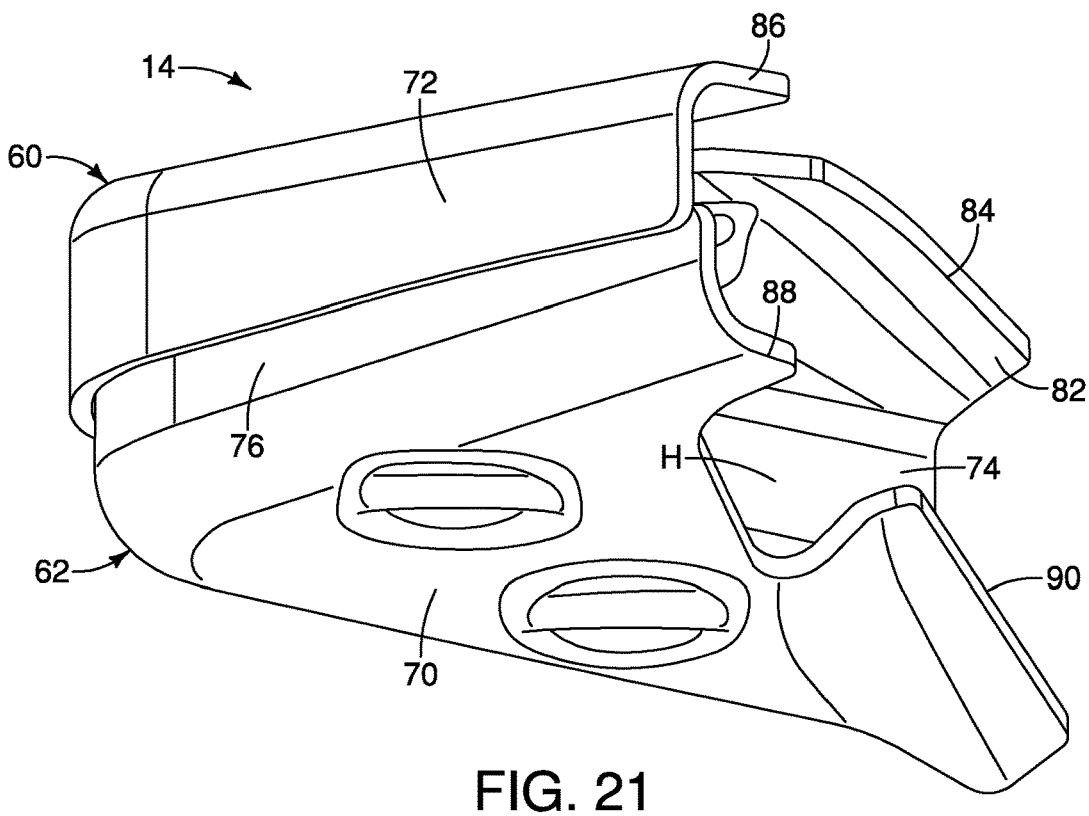
FIG. 21 is a perspective view of the upper and lower members of the impact receiving structure welded to one another showing portions of an underside of the impact receiving structure in accordance with the first embodiment.
Figure 22:
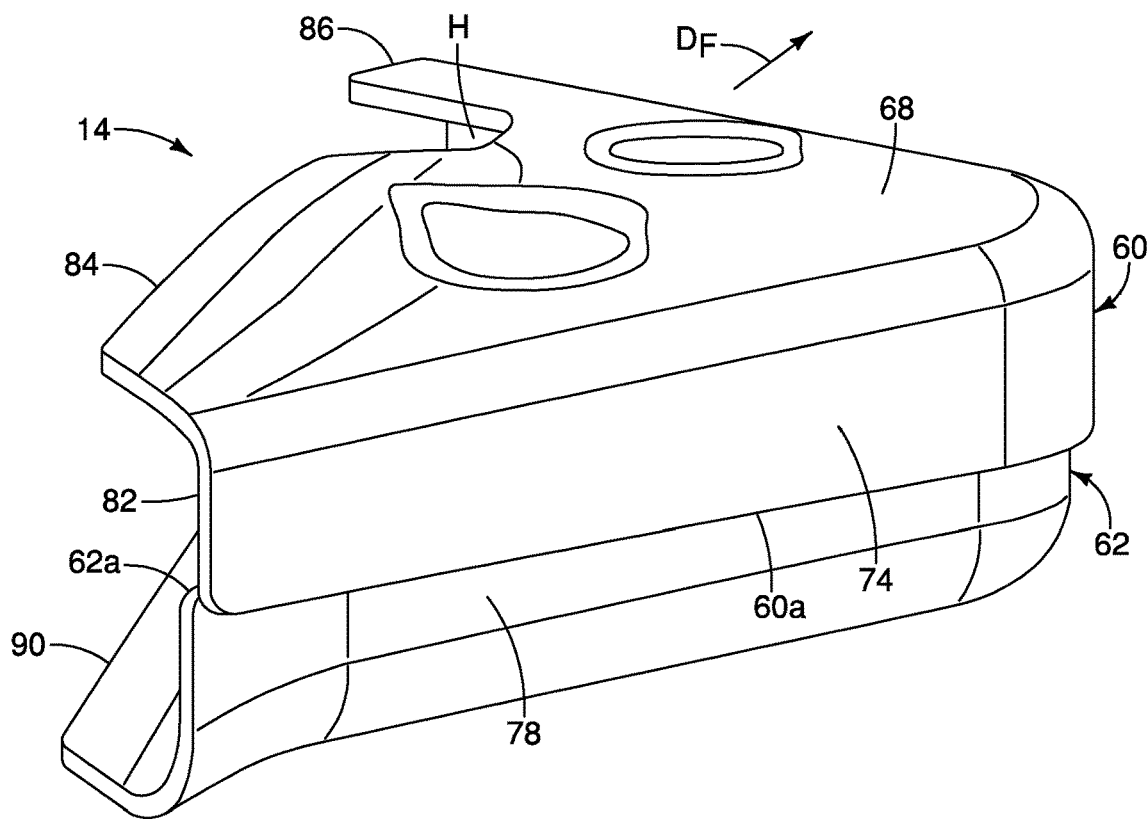
FIG. 22 is a perspective view of the upper and lower members of the impact receiving structure welded to one another showing portions of an upper side of the impact receiving structure in accordance with the first embodiment.
Figure 23:
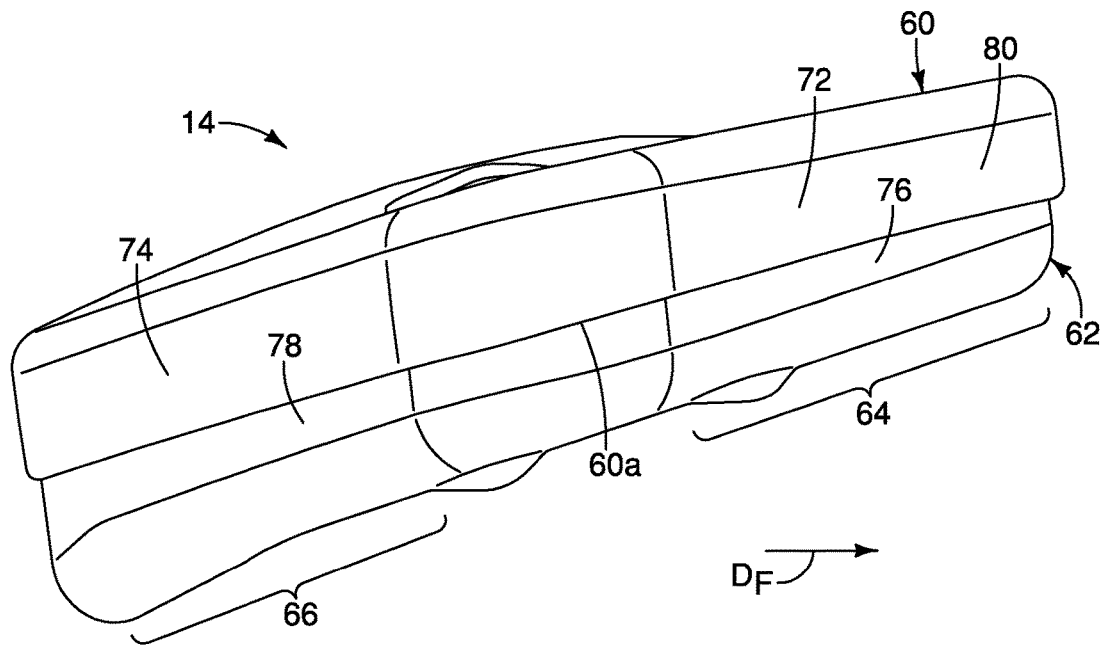
FIG. 23 is a side view of the upper member and the lower member of the impact receiving structure welded to one another showing an outboard side of the impact receiving structure in accordance with the first embodiment.
Figure 24:
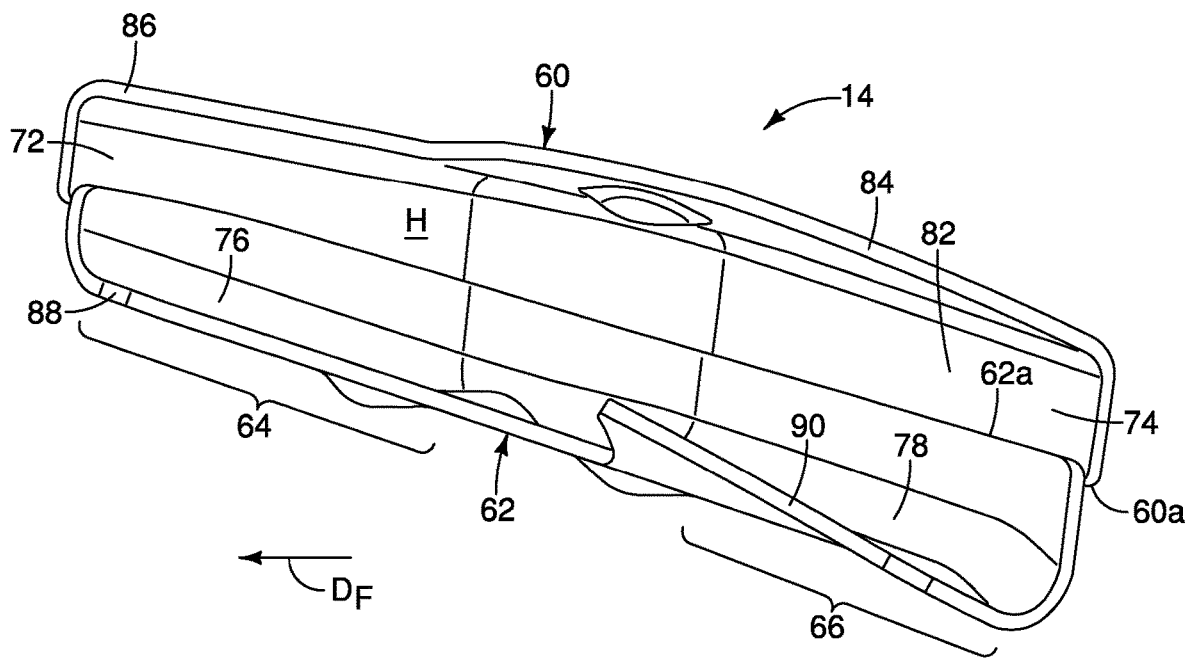
FIG. 24 is a side view of the upper member and the lower member of the impact receiving structure welded to one another showing an inboard side of the impact receiving structure in accordance with the first embodiment.

As shown in FIGS. 21, 22 and 24, the impact receiving structure 12 has an open inboard side 82 that is partially closed by attachment to the first side portion 20 of the engine cradle 12. Further, at the open inboard side 82, as shown in FIGS. 21 and 24, the upper member 60 of the impact receiving structure 12 has an upper inboard edge 84 that is welded to the forward section 30 of the first side portion 20 of the engine cradle 12 via welds W, as shown in FIGS. 6 and 7. The upper member 60 also has a forward inboard edge 86 that is spaced apart from the adjacent attachment collar 50.

The lower member 62 of the impact receiving structure 14 has a lower inboard edge 90 that is welded to a lower area of the first side portion 20 of the engine cradle 12 at a location below and spaced apart from the inboard edge 84 of the upper member 60 via welds W as shown in FIGS. 6 and 7. The lower member 62 also has a forward inboard edge 88 that is spaced apart from the adjacent attachment collar 50.

In the event of an impact event where an object or barrier impacts the forward facing surface 80 of one of the impact receiving structures 14, a portion of the impact energy received by the impact receiving structure 14 is transmitted through the engine cradle 12 to the front side members 16 of the vehicle 10 and to the vehicle itself. Since the forward inboard edge 86 of the upper member 60 and the forward inboard edge 88 are spaced apart from the adjacent attachment collar 50, the attachment collar 50 itself initially undergoes little if any deformation as a result of the impact event.

If the impact energy is of sufficient force, the angle β (see FIG. 3) defined by the forward facing surface 80 of the impact receiving structure 14 shape and location of the impact receiving structure 14 is such that the corresponding one of the first side portion 20 or the second side portion 22 of the engine cradle 12 can deform such that a portion of the corresponding side portion (20 or 22) can move toward in an inboard direction and contact the engine M or transmission T thereby transmitting a portion of the impact force to the engine M and the transmission T.

Second Embodiment

Figure 25:
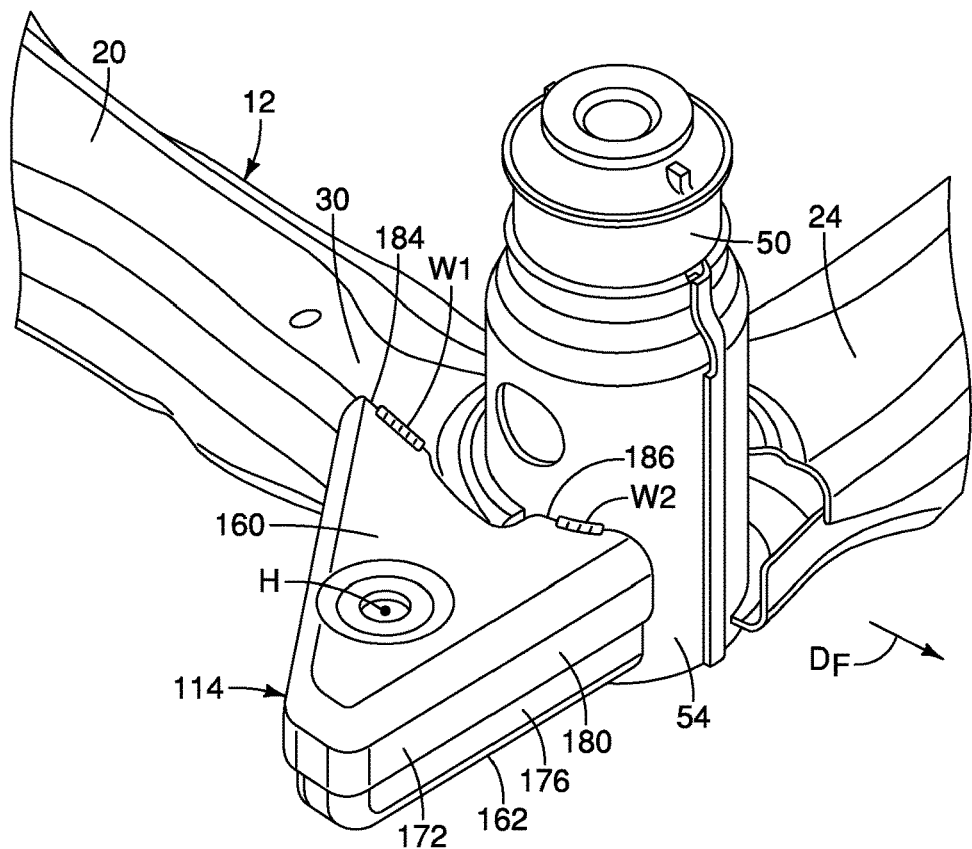
FIG. 25 is a perspective view of the first front corner of the engine cradle and an impact receiving structure in accordance with a second embodiment.
Figure 26:
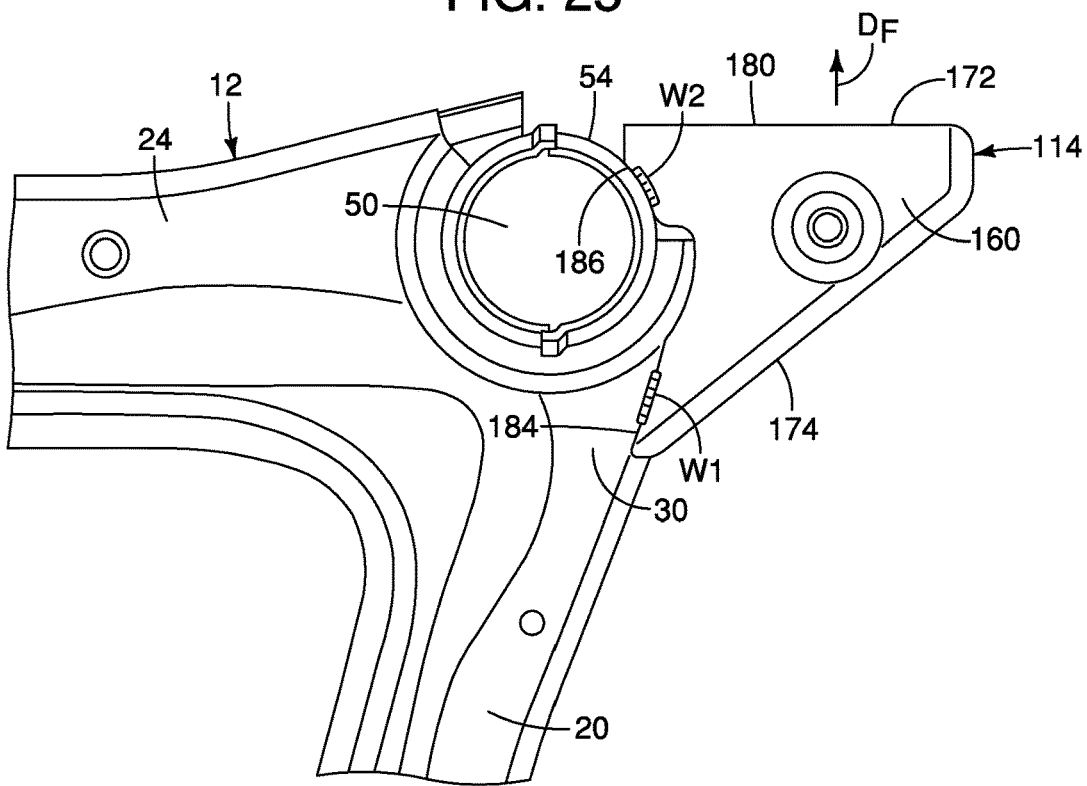
FIG. 26 is a top view of the first front corner of the engine cradle and the impact receiving structure in accordance with the second embodiment.
Figure 27:
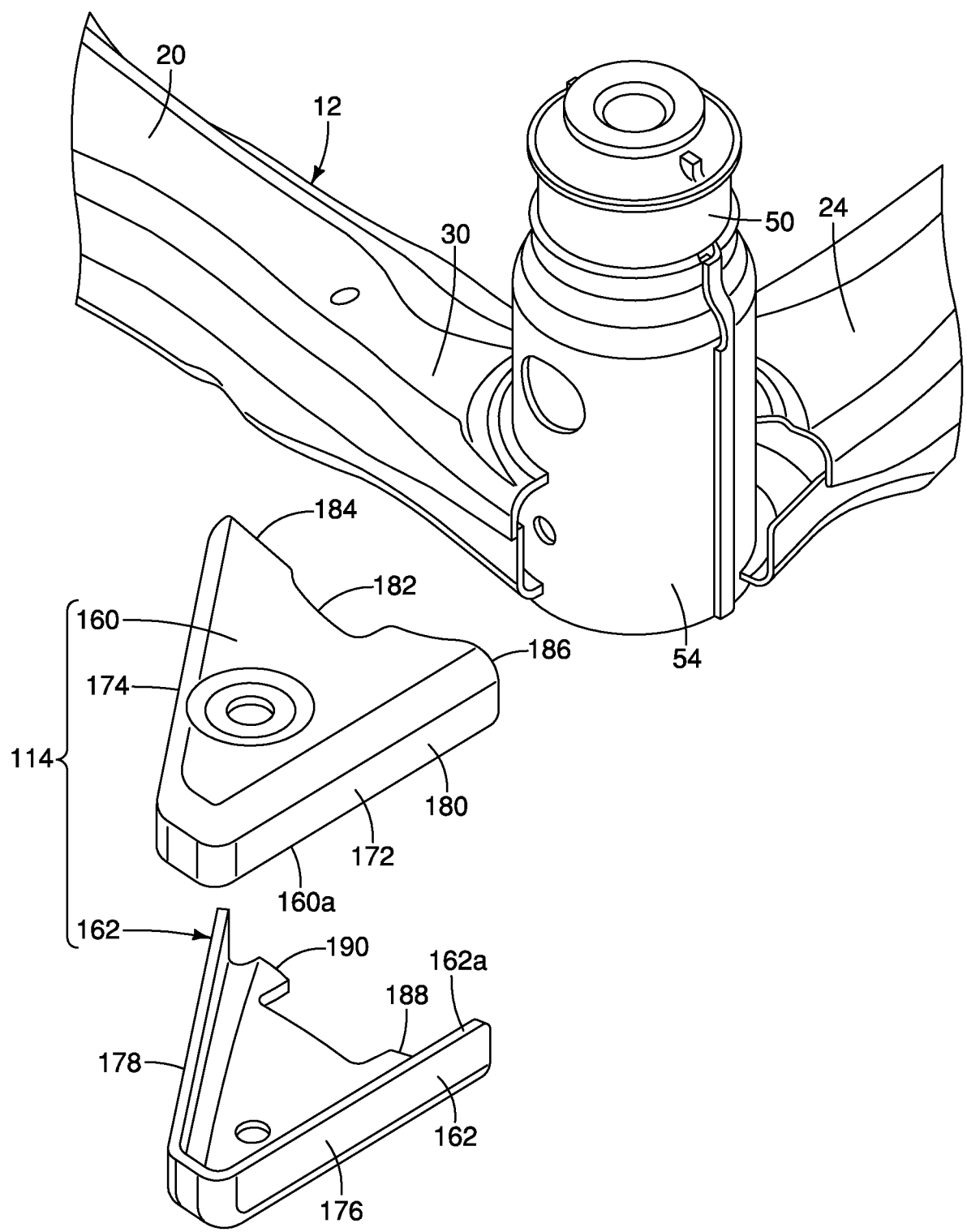
FIG. 27 is an exploded perspective view of the first front corner of the engine cradle showing an upper member and a lower member of the impact receiving structure in accordance with the second embodiment.

Referring now to FIGS. 25-27, an impact receiving structure 114 and the engine cradle 12 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The impact receiving structure 114 includes an upper member 160 and a lower member 162 that together define a hollow interior H and a forward facing surface 180. As shown in FIG. 27, the upper member 160 includes a lower edge 160a, a forward wall 172, a rearward outboard wall 174, an upper inboard edge 184, and a forward inboard edge 186. The lower member 162 includes an upper edge 162a, a forward wall 176, a rearward outboard wall 178, a lower inboard edge 190, and a forward inboard edge 188.

In the second embodiment, the forward facing surface 180 extends in a direction parallel to the front portion 24 of the engine cradle 12 and perpendicular to the vehicle forward direction $D_F$.

As shown in FIGS. 25 and 26, the upper member 160 and the lower member 162 are welded to one another by any of a variety of welding techniques. Further, the upper inboard edge 184 and the lower inboard edge 190 are welded to the forward section 30 of the first side portion 20 via first welds $W_1$. The forward inboard edge 186 of the upper member 160 and the forward inboard edge 188 of the lower member 162 are welded to the attachment collar 50 via second welds $W_2$.

The first welds $W_1$ are strong welds using welding techniques used to rigidly attach one metallic member to another metallic member. In other words, the first welds $W_1$ are for making structural connections between two metallic members.

The second welds $W_2$ are not strong nor are they for the purpose of making a structural connection. Rather, the second welds $W_2$ are intentionally weaker welds than the first welds $W_1$. Specifically, the second welds $W_2$ are mainly for the purpose of preventing noises being generated by contact between the forward inboard edge 186 of the upper member 160 and the attachment collar 50, and, prevent noises from being generated between the forward inboard edge 188 of the lower member 162 and the attachment collar 50. By welding the forward edges 186 and 188 to the attachment collar 50 with a weak weld, noises are prevented.

However, in the event of an impact event where impact energy is applied to the impact receiving structure 114, the second welds $W_2$ are easily broken, allowing the forward areas of the impact receiving structure 114 to move relative to the attachment collar 50. At the same time, the stronger first welds $W_1$ remain intact causing at least a portion of the impact energy received by the impact receiving structure 114 to be transmitted to the engine cradle 12 and to the vehicle 10. With sufficient levels of impact forces acting on the impact receiving structure 114, the side portion 20 (or 22) can deform, making contact with one of the engine M or transmission T (not shown in FIGS. 25-27) imparting some of the impact energy to the engine M and transmission T.

Third Embodiment

Figure 28:
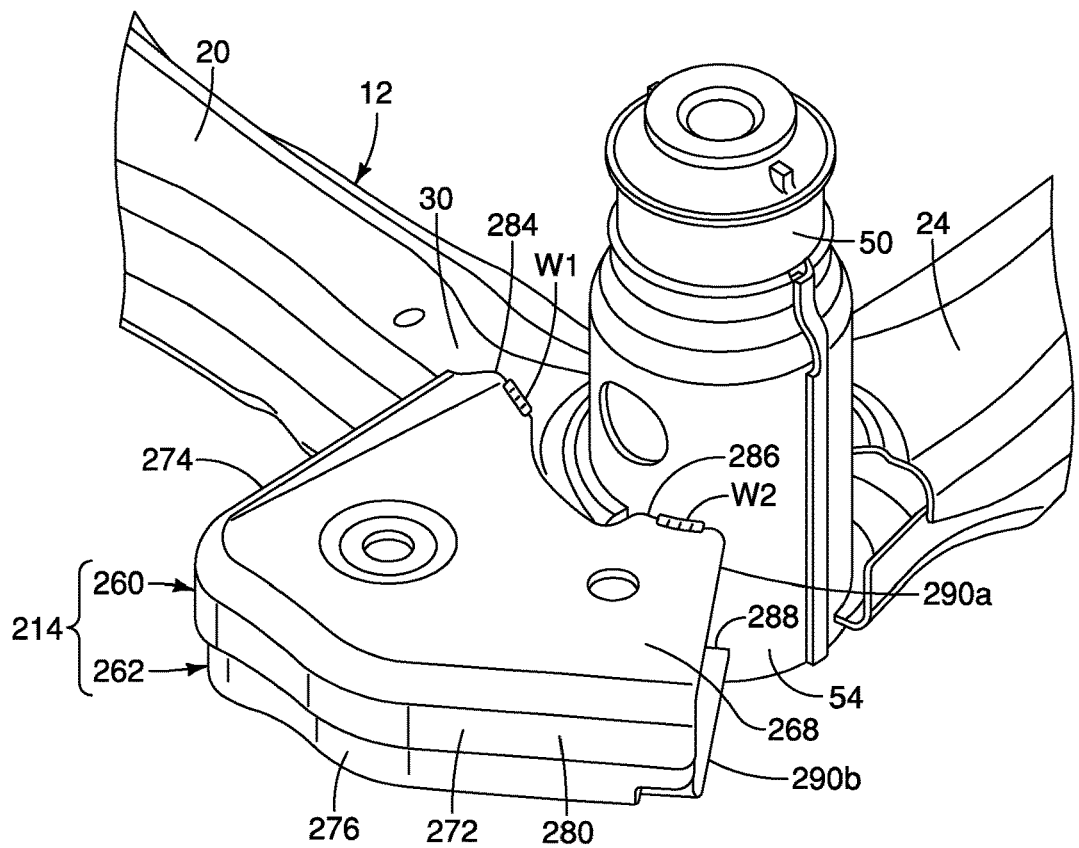
FIG. 28 is a perspective view of the first front corner of the engine cradle and an impact receiving structure in accordance with a third embodiment.
Figure 29:
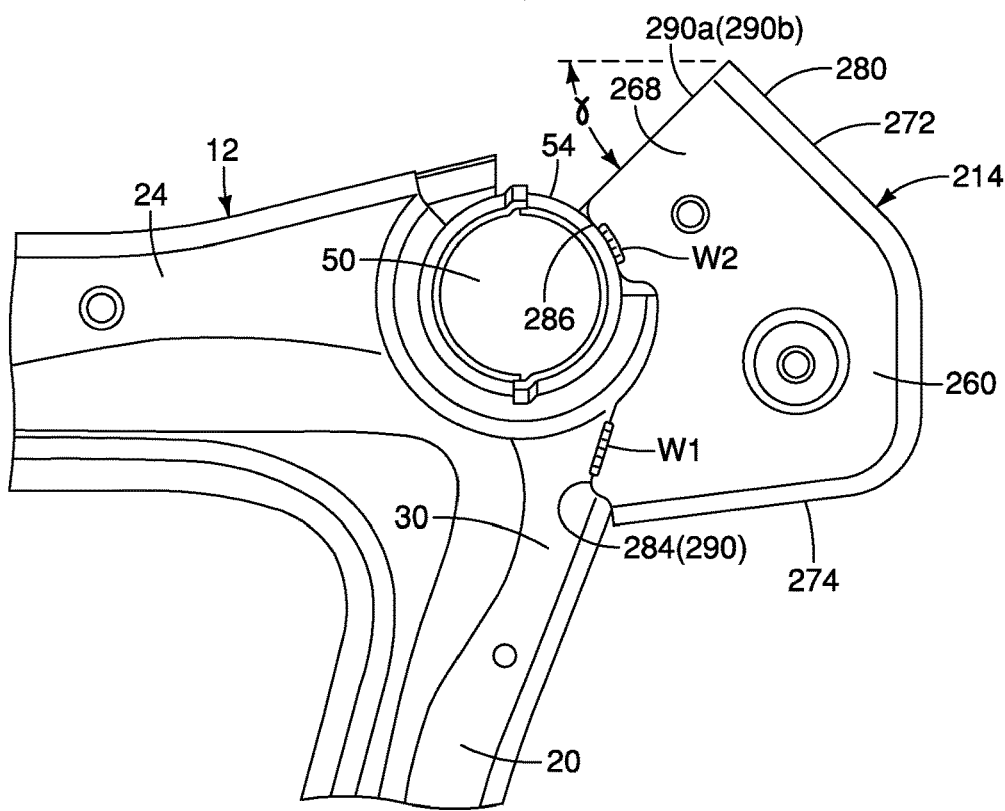
FIG. 29 is a top view of the first front corner of the engine cradle and the impact receiving structure in accordance with the third embodiment.

Referring now to FIGS. 28-29, an impact receiving structure 214 and the engine cradle 12 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The impact receiving structure 214 includes an upper member 260 and a lower member 262 that together define a hollow interior and a forward facing surface 280. The upper member 260 includes a forward wall 272, a rearward outboard wall 274, an upper inboard edge 284, and a forward inboard edge 286. The lower member 262 includes a forward wall 276, a lower inboard edge 290, and a forward inboard edge 288.

In the third embodiment, the forward facing surface 280 extends in a direction that is inclined relative to the front portion 24 of the engine cradle 12 and defines an acute angle with respect to the front portion 24, as shown in FIG. 29.

As shown in FIG. 28, the upper member 260 and the lower member 262 are welded to one another by any of a variety of welding techniques. Further, the upper inboard edge 284 and the lower inboard edge 290 are welded to the forward section 30 of the first side portion 20 via first welds $W_1$. The forward inboard edge 286 of the upper member 260 and the forward inboard edge 288 of the lower member 262 are welded to the attachment collar 50 via second welds $W_2$.

The first welds $W_1$ are strong welds using welding techniques used to rigidly attach one metallic member to another metallic member. In other words, the first welds $W_1$ are for making structural connections between two metallic members.

The second welds $W_2$ are not strong nor are they for the purpose of making a structural connection. Rather, the second welds $W_2$ are intentionally weaker welds than the first welds $W_1$. Specifically, the second welds $W_2$ are mainly for the purpose of preventing noises being generated by contact between the forward inboard edge 286 of the upper member 260 and the attachment collar 50, and, prevent noises from being generated between the forward inboard edge 288 of the lower member 262 and the attachment collar 50. By welding the forward edges 286 and 288 to the attachment collar 50 with a weak weld, noises are prevented.

However, in the event of an impact event where impact energy is applied to the impact receiving structure 214, the second welds $W_2$ are easily broken, allowing the forward areas of the impact receiving structure 214 to move relative to the attachment collar 50. At the same time, the stronger first welds $W_1$ remain intact causing at least a portion of the impact energy received by the impact receiving structure 214 to be transmitted to the engine cradle 12 and to the vehicle 10. With sufficient levels of impact forces acting on the impact receiving structure 214, the side portion 20 (or 22) of the engine cradle 12 can deform, making contact with one of the engine M or transmission T (not shown in FIGS. 28-29) imparting some of the impact energy to the engine M and transmission T.

The upper member 260 and the lower member 262 are dimensioned and shaped such that inboard and forward facing edges 290a and 290b of the impact receiving structure 214 define an opening that is open to the hollow interior. The forward facing edges 290a and 290b extend forward in a vehicle lateral direction and outboard direction defining a second acute angle γ relative to the front portion 24 of the engine cradle 12.

Fourth Embodiment

Figure 30:
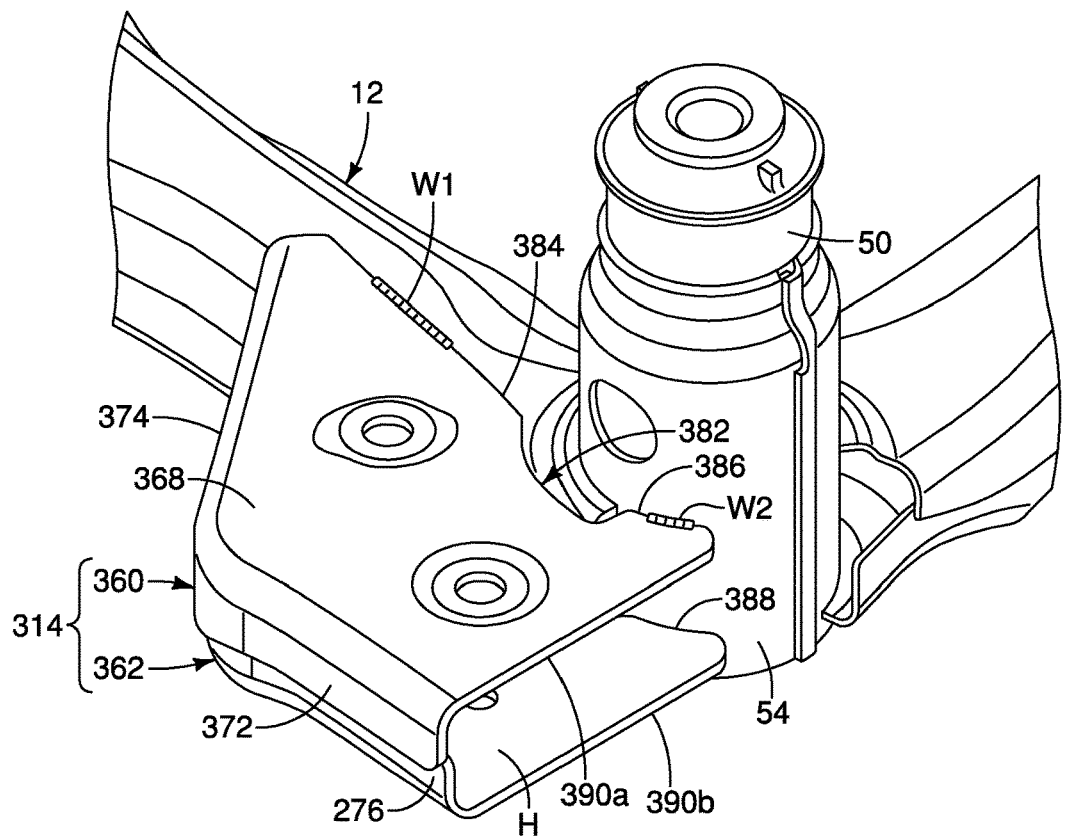
FIG. 30 is a perspective view of upper and lower members of an impact receiving structure welded to one another in accordance with a fourth embodiment.
Figure 31:
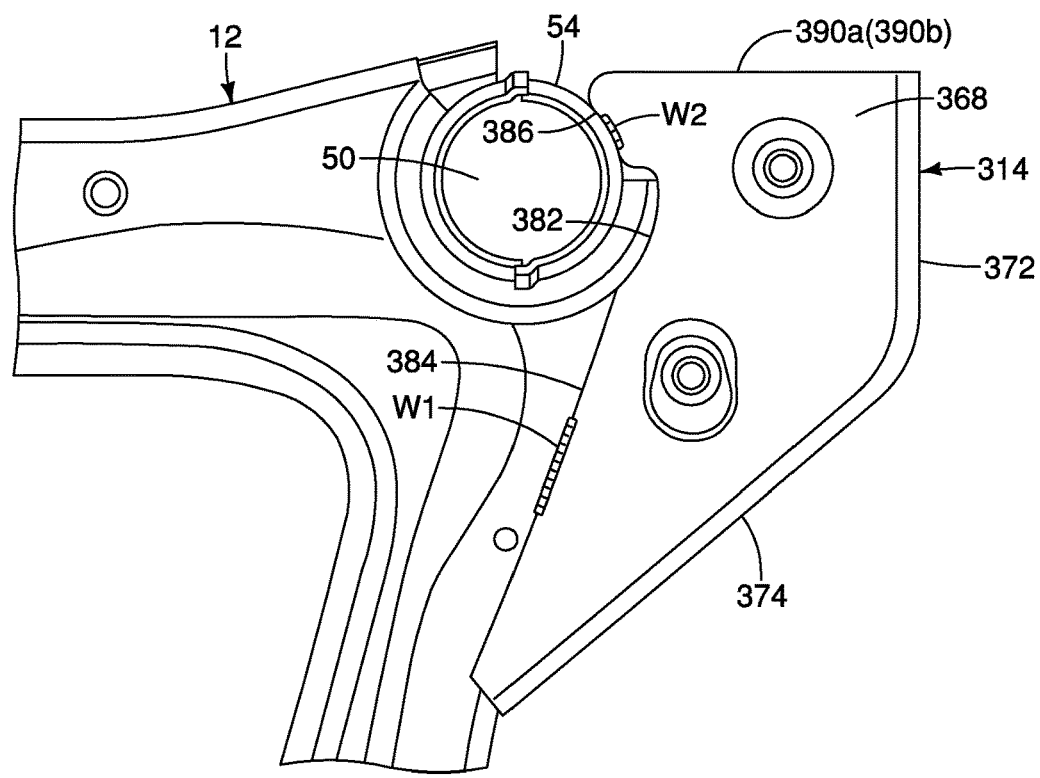
FIG. 31 is a top view of the impact receiving structure in accordance with the fourth embodiment.
Figure 32:
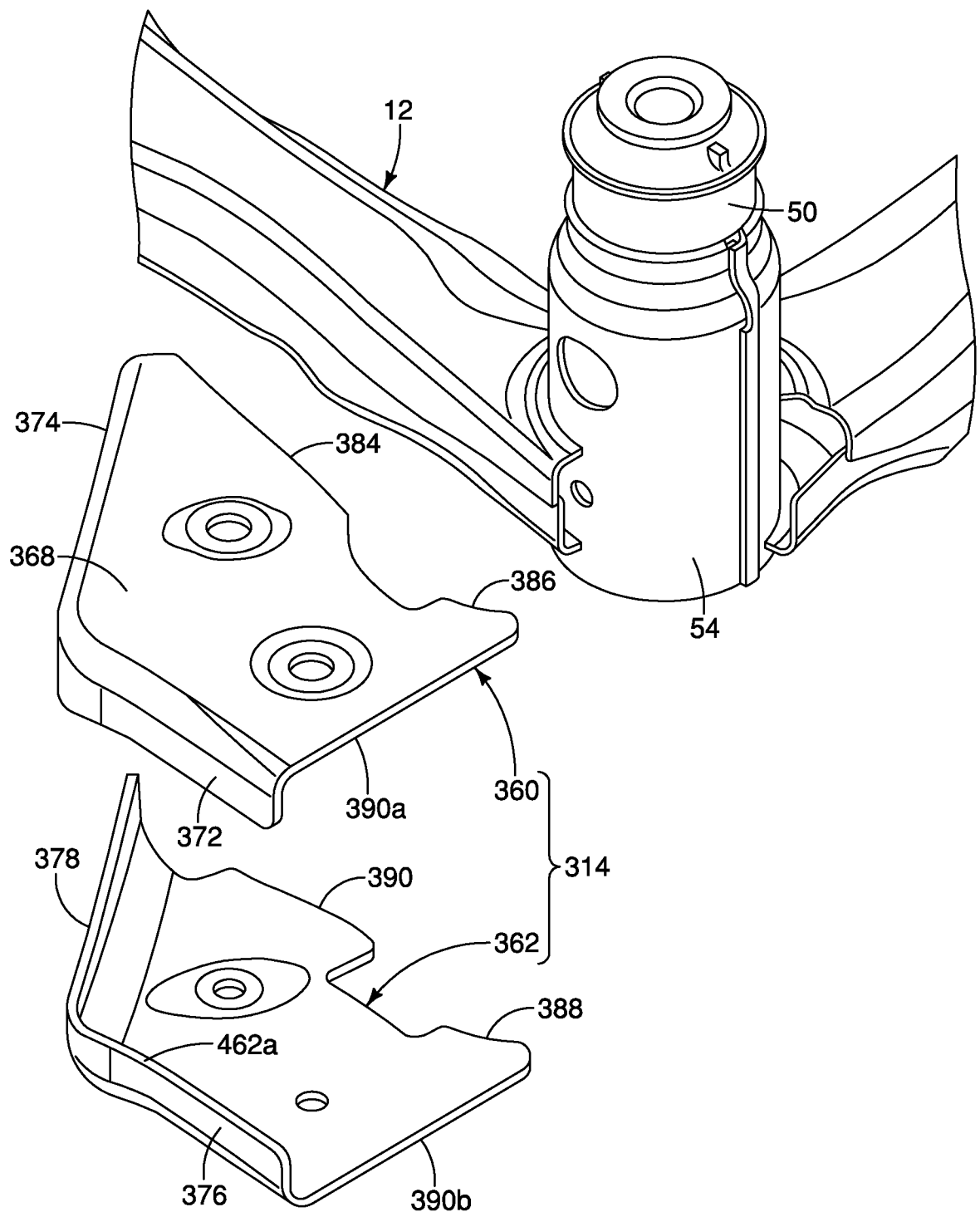
FIG. 32 is an exploded perspective view of the first front corner of the engine cradle showing the upper member and the lower member of the impact receiving structure in accordance with the fourth embodiment.

Referring now to FIGS. 30-32, an impact receiving structure 314 and the engine cradle 12 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The impact receiving structure 314 includes an upper member 360 and a lower member 362 that together define a hollow interior H and a forward facing end define by forward edges 390a and 390b (described below). The upper member 360 includes a forward edge 390a, an outboard side 372, a rearward outboard wall 174, an upper inboard edge 384, and a forward inboard edge 386. The lower member 362 includes a forward edge 390b, a side wall 376, a rearward outboard wall 378, a lower inboard edge 390, and a forward inboard edge 388.

In the fourth embodiment, the forward facing end define by forward edges 390a and 390b extends in a direction parallel to the front portion 24 of the engine cradle 12 and perpendicular to the vehicle forward direction $D_F$.

The upper member 360 and the lower member 362 are welded to one another by any of a variety of welding techniques. Further, the upper inboard edge 384 and the lower inboard edge 390 are welded to the forward section 30 of the first side portion 20 via first welds $W_1$. The forward inboard edge 386 of the upper member 360 and the forward inboard edge 188 of the lower member 162 are welded to the attachment collar 50 via second welds $W_2$.

The first welds $W_1$ are strong welds using welding techniques used to rigidly attach one metallic member to another metallic member. In other words, the first welds $W_1$ are for making structural connections between two metallic members.

The second welds $W_2$ are not strong nor are they for the purpose of making a structural connection. Rather, the second welds $W_2$ are intentionally weaker welds than the first welds $W_1$. Specifically, the second welds $W_2$ are mainly for the purpose of preventing noises being generated by contact between the forward inboard edge 386 of the upper member 360 and the attachment collar 50, and, prevent noises from being generated between the forward inboard edge 388 of the lower member 362 and the attachment collar 50. By welding the forward edges 386 and 388 to the attachment collar 50 with a weak weld, noises are prevented.

However, in the event of an impact event where impact energy is applied to the impact receiving structure 314, the second welds $W_2$ are easily broken, allowing the forward areas of the impact receiving structure 314 to move relative to the attachment collar 50. At the same time, the stronger first welds $W_1$ remain intact causing at least a portion of the impact energy received by the impact receiving structure 314 to be transmitted to the engine cradle 12 and to the vehicle 10. With sufficient levels of impact forces acting on the impact receiving structure 314, the side portion 20 (or 22) can deform, making contact with one of the engine M or transmission T (not shown in FIGS. 30-32) imparting some of the impact energy to the engine M and transmission T.

The forward facing edges 390a and 390b of the upper member 360 and the lower member 362 an opening that is open to the hollow interior H.

The vehicle 10 includes many features and components (other than the multiple embodiments of the impact receiving structures) are conventional components that are well known in the art. Since such features and components are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
an engine cradle having at least a first side portion and a front portion, a forward end of the first side portion and a first lateral end of the front portion being fixedly attached to one another defining a first front corner of the engine cradle, the first side portion having a rearward section and a forward section, the rearward section being horizontally oriented and the forward section extending upward and forward from the rearward section defining an acute angle therebetween, the acute angle being between 30 and 35 degrees, the forward section of the first side portion of the engine cradle has an upper surface that is inclined in a rearward direction defining the acute angle with respect to a level upper surface of the rearward section of the first side portion of the engine cradle;

an attachment collar having a lower end attached to the first front corner of the engine cradle and an upper end attached to a front member of a vehicle frame member; and an impact receiving structure installed to the first side portion proximate an intersection between the first side portion and the front member, the impact receiving structure having a forward portion adjacent to the attachment collar and a rearward portion that extends along the forward section of the first side portion, a lower surface of the impact receiving structure extending downward from the forward portion further defining the acute angle of the forward section of the first side portion of the engine cradle, the impact receiving structure has an upper surface that extends downward from the forward portion in the rearward direction defining the acute angle relative to the level upper surface of the rearward section of the first side portion of the engine cradle.

2. The vehicle body structure according to claim 1, wherein the acute angle is 33 degrees.

3. The vehicle body structure according to claim 1, wherein the impact receiving structure includes an upper member and a lower member that define a hollow interior of the impact receiving structure.

4. The vehicle body structure according to claim 3, wherein the impact receiving structure has an open inboard side that is partially closed by attachment to the first side portion of the engine cradle.

5. The vehicle body structure according to claim 3, wherein the upper member of the impact receiving structure has an inboard edge that is welded to the first side portion of the engine cradle.

6. The vehicle body structure according to claim 5, wherein the lower member of the impact receiving structure has an inboard edge that is welded to the first side portion of the engine cradle at a location below and spaced apart from the inboard edge of the upper member.

7. The vehicle body structure according to claim 3, wherein the upper member and the lower member are dimensioned and shaped such that a forward facing surface of the impact receiving structure is closed and extends rearward in an outboard direction.

8. The vehicle body structure according to claim 3, wherein the upper member and the lower member are dimensioned and shaped such that a forward facing surface of the impact receiving structure is closed and extends in a vehicle lateral direction approximately parallel to the front portion of the engine cradle.

9. The vehicle body structure according to claim 3, wherein the upper member and the lower member are dimensioned and shaped such that forward facing edges of the impact receiving structure define an opening that is open to the hollow interior, the forward facing edges extending forward in a vehicle lateral direction defining a second acute angle relative to the front portion of the engine cradle.

10. The vehicle body structure according to claim 3, wherein the upper member and the lower member are dimensioned and shaped such that forward facing edges of the impact receiving structure define an opening that is open to the hollow interior, the forward facing edges extending in a vehicle lateral direction approximately parallel to the front portion of the engine cradle.

11. The vehicle body structure according to claim 1, wherein a portion of the upper surface of the forward section of the first side portion of the engine cradle and a portion of the upper surface of the impact receiving structure are next to one another being side-by-side and both being inclined by the acute angle.

12. A vehicle body structure, comprising:

an engine cradle having at least a first side portion and a front portion, a forward end of the first side portion and a first lateral end of the front portion being fixedly attached to one another defining a first front corner of the engine cradle, the first side portion having a forward section and a rearward section, the rearward section of the first side portion being horizontally oriented, the forward section of the first side portion of the engine cradle has an upper surface that is inclined in a rearward direction defining an acute angle with respect to a level upper surface of the rearward section of the first side portion of the engine cradle;

an attachment collar having a lower end attached to the first front corner of the engine cradle and an upper end attached to a front member of a vehicle frame member; and an impact receiving structure installed to the first side portion proximate an intersection between the first side portion and the front member, the impact receiving structure having a forward portion adjacent to the attachment collar and a rearward portion that extends along the forward section of the first side portion, the forward portion being welded to the attachment collar via a first weld having a first attachment strength, and the rearward portion being welded to the forward section of the first side portion via a second weld having a second attachment strength that is greater than the first attachment strength, the impact receiving structure has an upper surface that extends downward from the forward portion in the rearward direction defining the acute angle relative to the level upper surface of the rearward section of the first side portion of the engine cradle.

13. The vehicle body structure according to claim 12, wherein the impact receiving structure includes an upper member and a lower member that define a hollow interior of the impact receiving structure.

14. The vehicle body structure according to claim 13, wherein the upper member of the impact receiving structure has an inboard edge that is welded to the first side portion of the engine cradle.

15. The vehicle body structure according to claim 14, wherein
the lower member of the impact receiving structure has an inboard edge that is welded to the first side portion of the engine cradle at a location below and spaced apart from the inboard edge of the upper member.

16. The vehicle body structure according to claim 13, wherein
the upper member and the lower member are dimensioned and shaped such that a forward facing surface of the impact receiving structure is closed and extends rearward in an outboard direction.

17. The vehicle body structure according to claim 13, wherein
the upper member and the lower member are dimensioned and shaped such that forward facing edges of the impact receiving structure define an opening that is open to the hollow interior, the forward facing edges extending forward in a vehicle lateral direction defining a second acute angle relative to the front portion of the engine cradle.

18. The vehicle body structure according to claim 13, wherein
the upper member and the lower member are dimensioned and shaped such that forward facing edges of the impact receiving structure define an opening that is open to the hollow interior, the forward facing edges extending in a vehicle lateral direction approximately parallel to the front portion of the engine cradle.

19. The vehicle body structure according to claim 12, wherein
the acute angle is between 30 and 35 degrees; and
a lower surface of the impact receiving structure extends downward from the forward portion to the rearward portion further defining the acute angle relative to the rearward section of the first side portion of the engine cradle.

20. The vehicle body structure according to claim 19, wherein
the acute angle is 33 degrees.

* * * * *